United States Patent
Park et al.

(10) Patent No.: US 10,572,210 B2
(45) Date of Patent: Feb. 25, 2020

(54) DISPLAY APPARATUS, IMAGE PLAYING APPARATUS, AND DISPLAY SYSTEM

(71) Applicant: SAMSUNG ELECTRONICS CO., LTD., Suwon-si (KR)

(72) Inventors: Ji Yong Park, Suwon-si (KR); Hye Rin Choi, Yongin-si (KR); Sang Kyun Im, Seoul (KR); Young-Hoon Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/139,448

(22) Filed: Sep. 24, 2018

(65) Prior Publication Data
US 2019/0095167 A1    Mar. 28, 2019

(30) Foreign Application Priority Data
Sep. 25, 2017    (KR) .................... 10-2017-0123682

(51) Int. Cl.
*G06F 3/14*    (2006.01)
*G06F 3/048*    (2013.01)
(Continued)

(52) U.S. Cl.
CPC .......... *G06F 3/1446* (2013.01); *G06F 3/0304* (2013.01); *G06F 3/048* (2013.01);
(Continued)

(58) Field of Classification Search
CPC ...... G06F 21/552; G06F 21/554; G06F 21/84; G06F 21/86; G06F 3/0304; G06F 3/048;
(Continued)

(56) References Cited

U.S. PATENT DOCUMENTS

| 5,555,156 A | 9/1996 | Decante |
| 2007/0172056 A1 | 7/2007 | Nakanishi et al. |

(Continued)

FOREIGN PATENT DOCUMENTS

| JP | 2009-163768 A | 7/2009 |
| KR | 10-2004-0044237 A | 5/2004 |

OTHER PUBLICATIONS

Search Report dated Jan. 23, 2019, issued by the International Searching Authority in counterpart International Patent Application No. PCT/KR2018/011329 (PCT/ISA/210).
(Continued)

*Primary Examiner* — Nelson M Rosario
(74) *Attorney, Agent, or Firm* — Sughrue Mion, PLLC

(57) ABSTRACT

A display apparatus includes a cabinet; a display panel provided on the cabinet; a door provided on the cabinet and configured to be opened and closed; a first detector configured to detect opening of the door and output a first signal in response to the door being opened; an image data receiver configured to receive content data from an image source device; and a first controller configured to control the display panel to display a first image corresponding to the content data received from the image source device and control the display panel to display a second image different from the first image in response to receiving the first signal.

15 Claims, 21 Drawing Sheets

(51) Int. Cl.
  *G06F 3/03*  (2006.01)
  *G06T 1/60*  (2006.01)
  *G06F 21/70* (2013.01)
(52) U.S. Cl.
  CPC .............. *G06F 3/1438* (2013.01); *G06T 1/60* (2013.01); *G06F 21/70* (2013.01); *G09G 2300/026* (2013.01)
(58) Field of Classification Search
  CPC ...... G06F 3/1438; G06F 3/1446; G06F 21/70; G06T 1/60; G08B 13/08; G09G 2300/026; G09G 2370/16
  See application file for complete search history.

(56) References Cited

U.S. PATENT DOCUMENTS

| | | | |
|---|---|---|---|
| 2008/0055423 A1 | 3/2008 | Ying et al. | |
| 2012/0105424 A1* | 5/2012 | Lee | G09F 9/35 345/212 |
| 2014/0184046 A1 | 7/2014 | Park et al. | |
| 2014/0361954 A1* | 12/2014 | Epstein | G06F 3/1454 345/2.3 |
| 2015/0038103 A1* | 2/2015 | Park | H04L 12/282 455/404.1 |
| 2017/0102911 A1 | 4/2017 | Hochman et al. | |
| 2017/0140131 A1 | 5/2017 | Greenberg et al. | |
| 2017/0140701 A1 | 5/2017 | Ogonowsky | |

OTHER PUBLICATIONS

Written Opinion dated Jan. 23, 2019, issued by the International Searching Authority in counterpart International Patent Application No. PCT/KR2018/011329 (PCT/ISA/237).

Communication dated Jan. 30, 2019, issued by the European Patent Office in counterpart European Patent Application No. 18196495.8.

* cited by examiner

FIG. 6A
FIG. 6B
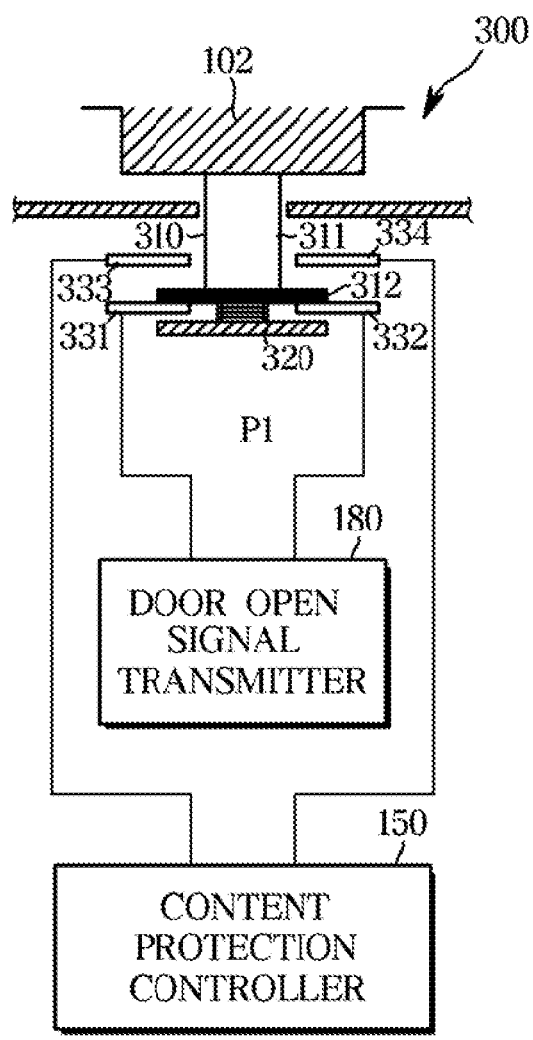
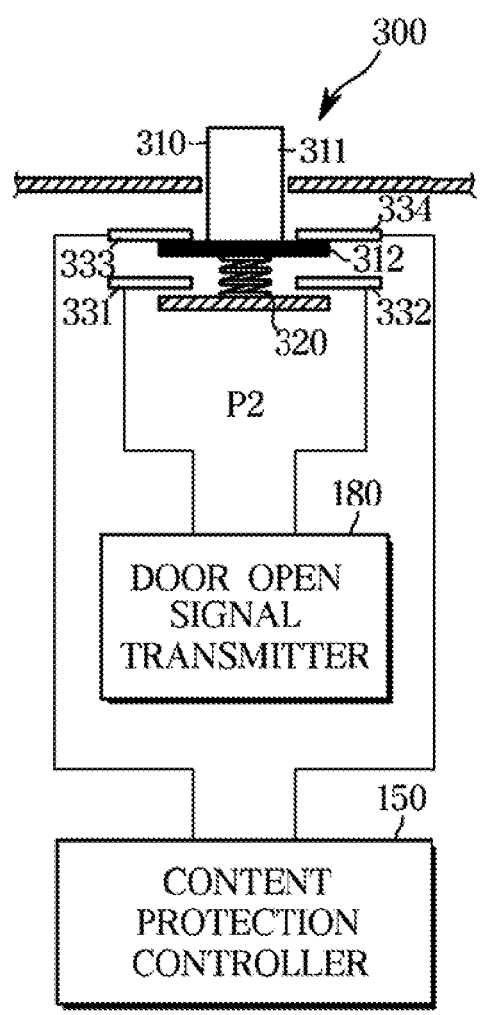

DISPLAY APPARATUS, IMAGE PLAYING APPARATUS, AND DISPLAY SYSTEM

CROSS-REFERENCE TO RELATED APPLICATION

This application is based on and claims priority under 35 U.S.C. § 119 to Korean Patent Application No. 10-2017-0123682, filed on Sep. 25, 2017, in the Korean Intellectual Property Office, the disclosure of which is incorporated by reference in its entirety.

BACKGROUND

1. Field

Apparatuses consistent with embodiments relate to a display system, and more particularly, to a display system including an image playing apparatus and a plurality of display apparatuses.

2. Description of the Related Art

In the related art, display apparatuses refer to output apparatuses displaying visual information converted from acquired or stored image information to users and have been widely used in various application fields such as individual homes or places of business.

For example, the display apparatuses may be monitor devices connected to personal computers or server computers, portable computer devices, navigation devices, televisions (TVs), Internet Protocol televisions (IPTVs), smart phones, tablet personal computers (PCs), personal digital assistants (PDAs), or portable terminals such as cellular phones. In addition, the display apparatuses may be various display apparatuses used to play advertisements or movies, or various types of audio/video systems in the industrial field.

The display apparatuses may display an image using various types of display panels. For example, the display apparatuses may include a light emitting diode (LED) panel, an organic light emitting diode (OLED) panel, a liquid crystal display (LCD) panel, and the like.

Furthermore, a plurality of display apparatuses may be combined to implement a large display screen. For example, a plurality of display apparatuses may be arranged in a matrix form, and a plurality of display apparatuses may integrally display one image.

SUMMARY

Therefore, in accordance with an aspect of the disclosure, embodiments provide a display system including a plurality of display apparatuses capable of displaying one image as a whole.

In accordance with another aspect of the disclosure, embodiments provide a display system capable of detecting an external intrusion into each of the plurality of display apparatuses.

In accordance with another aspect of the disclosure, embodiments provide a display system capable of protecting content in response to the external intrusion detection for the display apparatuses.

Additional aspects of the disclosure will be set forth in part in the description which follows and, in part, will be obvious from the description, or may be learned by practice of the disclosure.

In accordance with an aspect of the present disclosure, a display apparatus includes: a cabinet; a display panel provided on one side of the cabinet; a door provided on the other side of the cabinet, and configured to open and close the cabinet; a door open detector configured to detect opening of the door and output a door opening signal in response to detecting the opening of the door; an image data receiver configured to receive content data from an image source device; and a first controller configured to control the display panel to display a first image corresponding to the content data received from the image source device and control the display panel to display a second image different from the first image when the door is determined to be opened.

The first controller may control the display panel to display the second image when the door is determined to be opened while the first controller is connected to the image source device and control the display panel to display a third image different from the first and second images when the door is determined to be opened while the first controller is not connected to the image source device.

The display apparatus may further include: a storage; and a second controller configured to receive the door opening signal from the door open detector and store door opening/closing status information in the storage in response to the door opening signal.

A power may be supplied to the door open detector, the storage and the second controller even when power is not supplied to the display panel and the first controller.

The display apparatus may further include: a door open signal transmitter configured to receive the door open signal from the door open detector and transmit the door open signal to the image source device. The door open detector may output the door opening signal to both the second controller and the door open signal transmitter in response to detecting the opening of the door.

The door open detector may include a door switch. The door switch may include first and second terminals connected to the door open signal transmitter and separated from each other; third and fourth terminals connected to the second controller and separated from each other; and a switch body configured to connect between the first and second terminals or connect between the third and fourth terminals according to the opening and closing of the door.

The door open detector may include an infrared sensor. The infrared sensor may include a light emitting element configured to emit light; and a light receiving element configured to receive or not receive light emitted from the light emitting element according to the opening and closing of the door.

In accordance with another aspect of the present disclosure, a display system includes: an image source device; and a plurality of display apparatuses configured to receive content data from the image source device and display an image corresponding to the content data. At least one display apparatus among the plurality of display apparatuses may include a cabinet; a display panel provided on one side of the cabinet; a door provided on the other side of the cabinet, and configured to open and close the cabinet; a door open detector configured to detect opening of the door and output a door opening signal in response to detecting the opening of the door; an image data receiver configured to receive content data from an image source device; and a first controller configured to control the display panel to display a first image corresponding to the content data and control the display panel to display a second image different from the first image when the door is determined to be opened.

The display system may further include: a storage; a second controller configured to receive the door opening signal from the door open detector and store door opening/ closing status information in the storage in response to the door opening signal; and a door open signal transmitter configured to receive the door open signal from the door open detector and transmit the door open signal to the image source device.

A power may be supplied to the door open detector, the storage and the second controller even when power is not supplied to the display panel and the first controller.

The image source device may include an image data transmitter configured to transmit the content data to the plurality of display apparatuses; a door open signal receiver configured to receive the door opening signal from the at least one display apparatus; and a third controller configured to stop transmission of the content data to the plurality of display apparatuses in response to receiving of the door opening signal.

The third controller may receive the door opening/closing status information from the plurality of display apparatuses when the door opening signal is received, and identify the at least one display apparatus based on the door opening/closing status information.

The third controller may transmit image data of a third image warning the door opening of the at least one display apparatus to the plurality of display apparatuses. The first controller may display the third image on the display panel.

The third controller may determine system check or system intrusion of the at least one display apparatus according to a user input.

The third controller may continue transmission of the content data to the plurality of display apparatuses through the image data transmitter when it is determined that the system check is performed on the at least one display apparatus is determined, and stop transmission of the content data through the image data transmitter when it is determined that the system intrusion is performed on the at least one display apparatus is determined.

In accordance with another aspect of the present disclosure, an image source device includes: an image data transmitter configured to transmit content data to a plurality of display apparatuses; a door open signal receiver configured to receive a door opening signal from at least one display apparatus among the plurality of display apparatuses; and a controller configured to transmit the content data through the image data transmitter and stop transmission of the content data when the door opening signal is received through the door open signal receiver.

The controller may receive door opening/closing status information from the plurality of display apparatuses when the door opening signal is received, and identify the at least one display apparatus based on the door opening/closing status information.

The controller may transmit warning image data to the plurality of display apparatuses so that the plurality of display apparatuses displays a warning image warning the door opening of the at least one display apparatus.

The controller may determine system check or system intrusion of the at least one display apparatus according to a user input.

The controller may continue transmission of the content data to the plurality of display apparatuses when it is determined that the system check is performed on the at least one display apparatus is determined, and stop transmission of the content data through the image data transmitter when it is determined that the system intrusion is performed on the at least one display apparatus is determined.

In accordance with another aspect of the present disclosure, a display apparatus includes: a cabinet; a display panel provided on the cabinet; a door provided on the cabinet and configured to be opened and closed; a first detector configured to detect opening of the door and output a first signal in response to the door being opened; an image data receiver configured to receive content data from an image source device; and a first controller configured to control the display panel to display a first image corresponding to the content data received from the image source device and control the display panel to display a second image different from the first image in response to receiving the first signal.

The first controller may be configured to control the display panel to display the second image in response to receiving the first signal while the first controller is connected to the image source device. The first controller may be further configured to control the display panel to display a third image different from the first and second images in response to receiving the first signal while the first controller is disconnected from the image source device.

The display apparatus may further include: a memory; and a second controller configured to receive the first signal from the first detector and store door status information in the memory in response to receiving the first signal.

First power is independently supplied to the first detector, the memory and the second controller separate from second power being supplied to the display panel and the first controller.

The display apparatus may further include: a transmitter configured to receive the first signal from the first detector and transmit the first signal to the image source device. The first detector may be configured to output the first signal to both the second controller and the transmitter in response to detecting the door being opened.

The first detector includes a door switch. The door switch may include: first and second terminals connected to the transmitter and being separated from each other; third and fourth terminals connected to the second controller and being separated from each other; and a switch body configured to electrically connect the first and second terminals or electrically connect the third and fourth terminals based on the door being opened or closed.

The first detector may include an infrared sensor. The infrared sensor may include: a light emitter configured to emit light; and a light receiver configured to receive or not receive light emitted from the light emitter based on the door being opened or closed.

In accordance with another aspect of the present disclosure, a display system includes: an image source device; and a plurality of display apparatuses configured to receive content data from the image source device and display a first image corresponding to the content data. At least one display apparatus of the plurality of display apparatuses may include: a cabinet; a display panel provided on the cabinet; a door provided on the cabinet and configured to be opened and closed; a first detector configured to detect opening of the door and output a first signal in response to the door being opened; an image data receiver configured to receive content data from the image source device; and a first controller configured to control the display panel to display the first image corresponding to the content data and control the display panel to display a second image different from the first image in response to receiving the first signal.

The display system may further include: a memory; a second controller configured to receive the first signal from the first detector and configured to store door status information in the memory in response to receiving the first signal; and a first transmitter configured to receive the first signal from the first detector and transmit the first signal to the image source device.

The image source device may include: a second transmitter configured to transmit the content data to the plurality of display apparatuses; a first receiver configured to receive the first signal from the at least one display apparatus; and a third controller configured to stop transmission of the content data to the plurality of display apparatuses in response to receiving of the first signal.

The third controller may be configured to receive the door status information from the plurality of display apparatuses when the first signal is received, and identify the at least one display apparatus based on the door status information.

The third controller may be configured to transmit image data of a third image to warn the door of the at least one display apparatus being opened. The first controller may be configured to display the third image on the display panel.

The third controller may be configured to determine system check or unauthorized system intrusion of the at least one display apparatus.

The third controller may be configured to continue transmission of the content data to the plurality of display apparatuses through the second transmitter in response to determining the system check being performed on the at least one display apparatus. The third controller may be configured to stop the transmission of the content data through the second transmitter in response to determining the unauthorized system intrusion occurring on the at least one display apparatus.

In accordance with another aspect of the present disclosure, an image source device includes: an image data transmitter configured to transmit content data to a plurality of display apparatuses; a signal receiver configured to receive a first signal from at least one display apparatus of the plurality of display apparatuses; and a controller configured to transmit the content data through the image data transmitter and configured to stop transmission of the content data in response to the signal receiver receiving the first signal.

The controller may be configured to receive door status information from the plurality of display apparatuses in response to the first signal being received. The controller may be configured to identify the at least one display apparatus based on the door status information.

The controller may be configured to transmit warning image data to the plurality of display apparatuses, and wherein the plurality of display apparatuses is configured to display a warning image based on the warning image data received from the controller.

The controller may be configured to determine whether the first signal is based on system check or unauthorized system intrusion of the at least one display apparatus.

The controller may be configured to continue transmission of the content data to the plurality of display apparatuses in response to determining that the system check is performed on the at least one display apparatus. The controller may be configured to stop the transmission of the content data through the image data transmitter in response to determining the unauthorized system intrusion.

In accordance with another aspect of the present disclosure, a display system includes: an image source device configured to provide content data; and a display device comprising a plurality of display apparatuses and configured to display a first image corresponding to the content data. Each of the plurality of display apparatuses may include: a door; a first detector configured to detect opening of the door and output a first signal in response to the door being opened; and a first controller configured to control the display device to display a second image different from the first image in response to receiving the first signal. The image source device includes: a signal receiver configured to receive the first signal from the first detector; and a second controller configured to stop transmission of the content data in response to the signal receiver receiving the first signal.

The second controller may be configured to determine whether the first signal is based on system check or unauthorized system intrusion in the display device.

The second controller may be configured to continue transmission of the content data to the display device in response to determining that the system check is performed on the display device. The second controller may be configured to stop the transmission of the content data in response to determining the unauthorized system intrusion in the display device.

BRIEF DESCRIPTION OF THE DRAWINGS

The above and/or other aspects of the disclosure will become apparent and more readily appreciated from the following description of embodiments, taken in conjunction with the accompanying drawings of which:

FIGS. 6A and 6B are views illustrating an example of a door open detector which is included in a display apparatus according to an embodiment;

DETAILED DESCRIPTION

Figure 1:
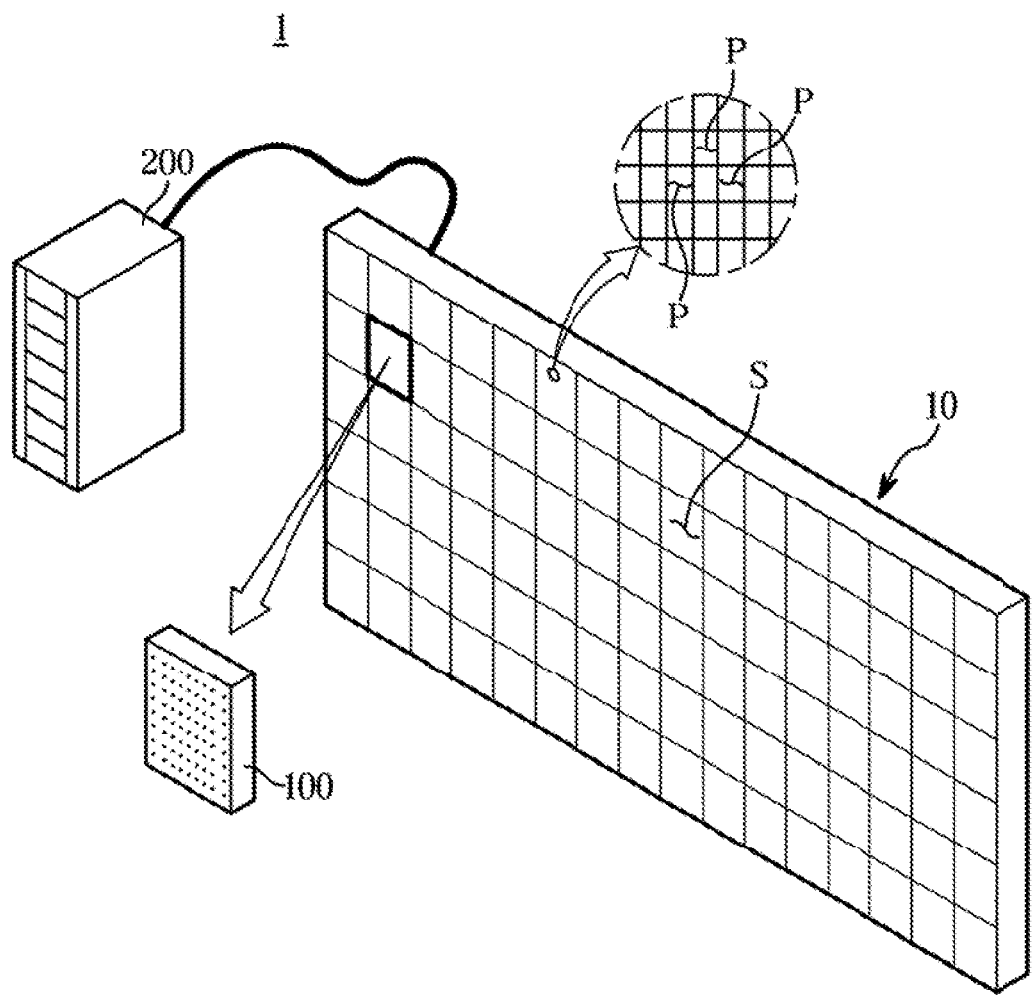
FIG. 1 is a view illustrating a display system according to an embodiment.

FIG. 1 is a view illustrating a display system according to an embodiment.

Referring to FIG. 1, a display system 1 may include a display device 10 including a plurality of display apparatuses 100 for visually displaying an image and an image playing apparatus 200 for providing an image data to the plurality of display apparatuses 100. The display system 1 may be used as a large screen of a movie theater or as a large billboard installed outdoors, (e.g., a rooftop of a building or a bus stop). The location of the display system 1 is not limited to the air open site, and the display system 1 may be installed in any place, even indoors, so long as the location of the display system 1 allows frequent visits of a large number of people, such as a subway station, a shopping mall, the movie theater, a company, and a store, and the like.

The image source device 200 may include a storage/memory device capable of storing content containing video or may receive the content from an external content source (e.g., a video streaming service server). For example, the image source device 200 may store a file of a content data in the storage or receive the content data from the external content source.

The image source device 200 may decode the stored or received content data into an image frame data for the plurality of display apparatuses 10. For example, the content data may be compressed by various video compression standards such as Moving Picture Experts Group (MPEG) and High Efficiency Video Coding (HEVC). The image source device 200 may restore the image frame data representing each image frame from the compressed content data.

In addition, the image source device 200 may transmit the restored image frame data to the display device 10. The image source device 200 may transmit the image frame data to the plurality of display apparatuses 100 of the display device 10 through a separate image data transmission line.

The plurality of display apparatuses 100 may be arranged in rows and columns as illustrated in FIG. 1. In other words, the plurality of display apparatuses 100 may be arranged in a matrix form. For example, 16×6 display apparatuses 100 may be arranged in the 16 by 6 matrix form in the display device 10.

The plurality of display apparatuses 100 arranged in the matrix form may integrally form one screen S. In other words, the plurality of display apparatuses 100 may integrally display one continuous image.

A plurality of pixels P may be provided on the screen S, and the image displayed on the screen S may be formed by a combination of light emitted from the plurality of pixels P. For example, the plurality of pixels P may emit light with various brightness and colors. The one image may be formed on the screen S by combining light emitted from the plurality of pixels P as a mosaic.

The screen S may be formed of various numbers of pixels P depending on the resolution. For example, the screen S having a 4K resolution by Digital Cinema Initiatives (DCI) may be formed of 4096×2160 pixels P. As another example, the screen S having an Ultra High Definition (UHD) resolution in the digital video format of the International Telecommunication Union (ITU) may be formed of 3840×2160 pixels P.

Each of the plurality of display apparatuses 100 may include a display panel formed with the plurality of pixels P for forming the screen S. The number of pixels P provided in each of the plurality of display apparatuses 100 may be different according to the resolution of the screen S and the number of the plurality of display apparatuses 10. For example, when the screen S having 4K resolution (4096×2160) is formed by 16×6 display apparatuses 10, 256×360 pixels P may be formed in the plurality of display apparatuses 100.

The plurality of display apparatuses 100 may display a portion of the image displayed on the full screen S. The plurality of display apparatuses 100 may provide a part of the screen S according to the arrangement thereof and output a different portion of the entire image according to the arrangement.

The plurality of display apparatuses 100 may receive the image frame data from the image source device 200 through the image data transmission line L1 (see FIG. 5) and display the image corresponding to the received image frame data from the image source device 200.

For example, the image source device 200 may transmit the image frame data of the entire image to the plurality of display apparatuses 10. The plurality of display apparatuses 100 may obtain the portion of the image frame data corresponding to each position in the image frame data of the entire image and display the image corresponding to the portion of the image frame data.

As another example, the image source device 200 may partition the image frame data into a plurality of sub image frame data and transmit the sub image frame data to the plurality of display apparatuses 10. The plurality of display apparatuses 100 may display the image corresponding to the sub image frame data.

The one image integrated by the combination of images output by the plurality of display apparatuses 100 may be displayed on the display device 10.

As such, the display system 1 may display the image of the content, and may protect the displayed content from hacking.

The display system 1 may display paid content or private content, and the paid content or the private content may be leaked to the public by a hacker.

For example, in order to acquire the content data, the hacker may install a hacking device capable of probing a connection through which the display apparatus 100 and the image source device 200 are connected to transmit image frame data. In this way, when the image source device 200 transmits the image frame data of the entire image to the plurality of display apparatuses 10, the hacker may acquire the image frame data of all contents transmitted from the image source device 200 to the display apparatus 100 and restore or reproduce the content from the image frame data.

In addition, even when the partitioned image is transmitted to each display apparatus, the hacker may hack the entire image frame data through one display apparatus amongst the plurality of display apparatuses 10. The data transmitted from the image source device 200 to the plurality of display apparatuses 100 may include metadata as well as the image data, and the metadata may include information related to the image data and information related to the set. In particular, if the metadata includes information related to ways to access the image source device 200, the hacker may hack into the image source device 200 through the display apparatus and obtain the image data from the image source device 200.

In order to prevent the above-described content hacking, the display system 1 may include a protection means for preventing the hacking of the content.

Hereinafter, the image source device 200 and the plurality of display apparatuses 100 of the display device 10 capable of displaying the images by the content and protecting the content from potential hackers will be described in detail.

Figure 2:
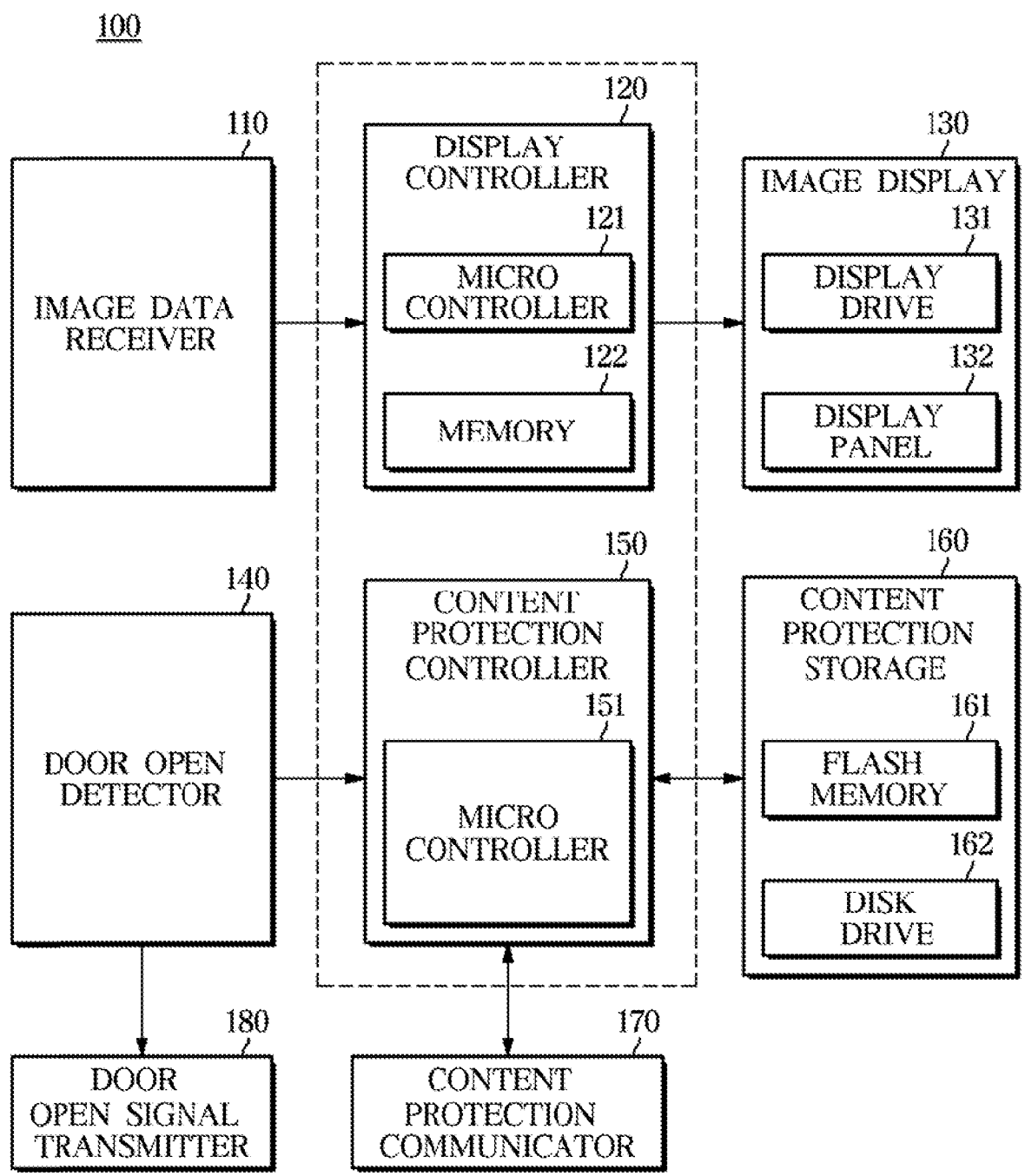
FIG. 2 is a view illustrating a configuration of a display apparatus according to an embodiment.
Figure 3:
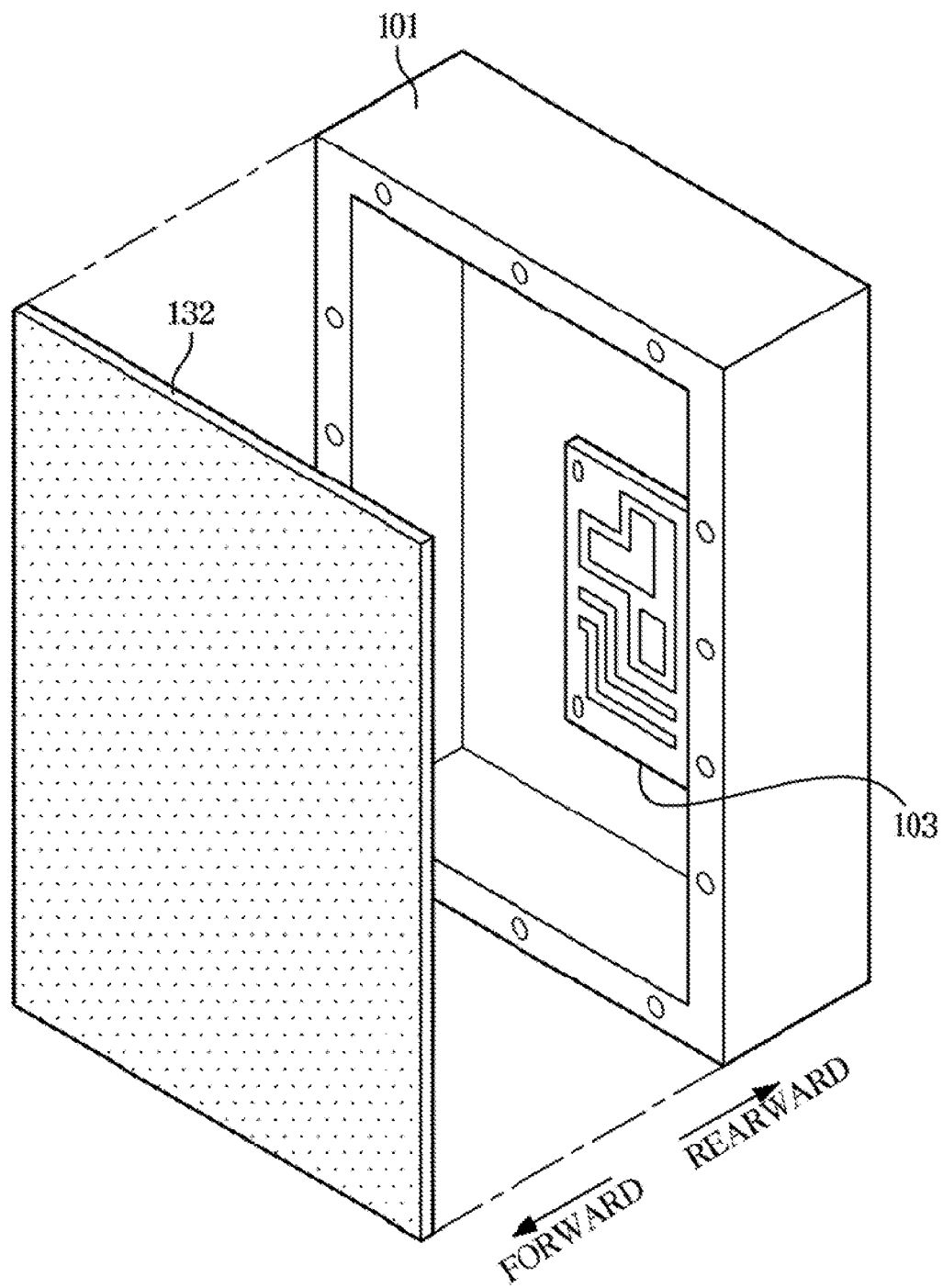
FIG. 3 is an exploded view illustrating a front surface of the display apparatus according to an embodiment.
Figure 4:
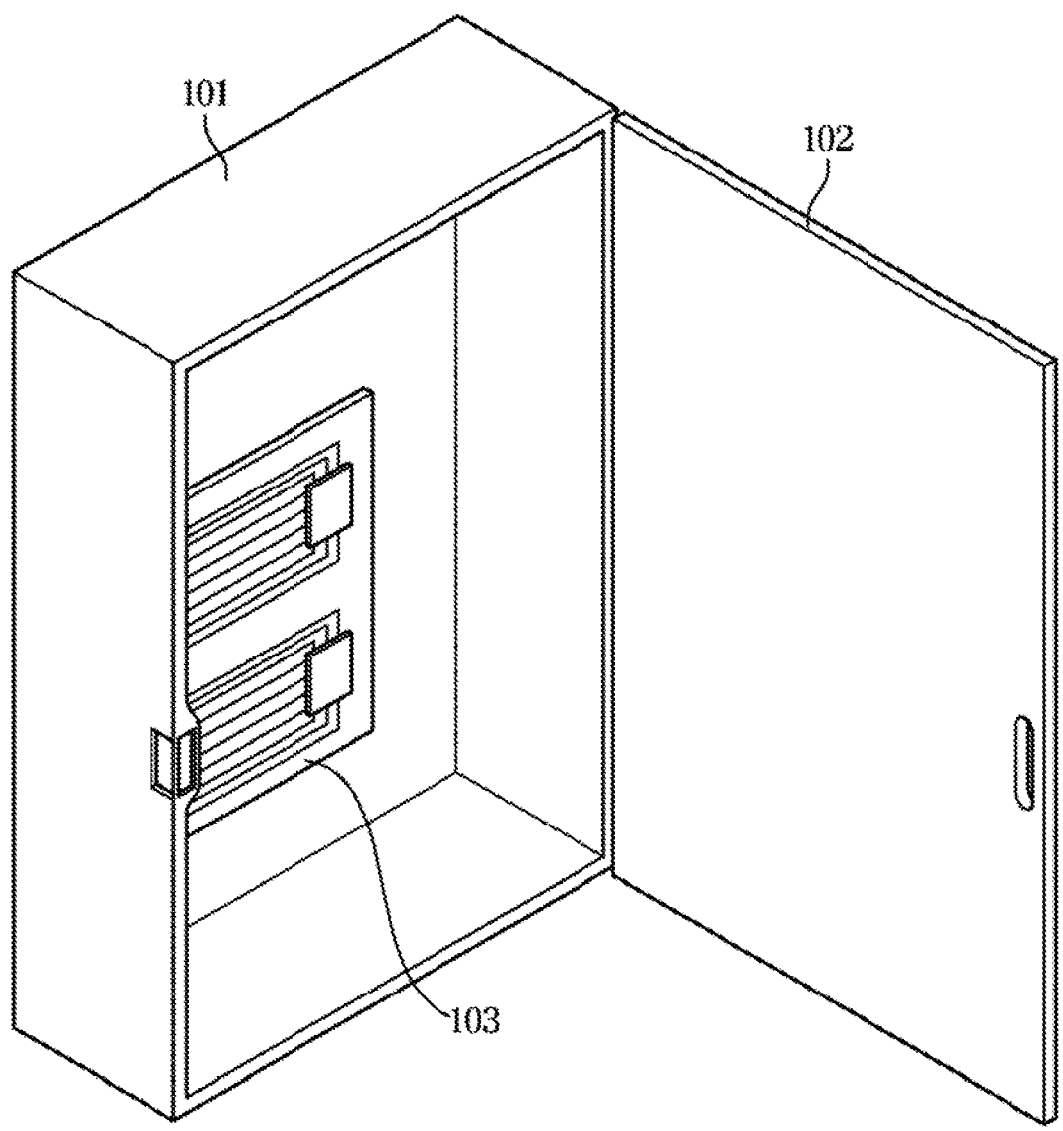
FIG. 4 is a rear view illustrating the display apparatus according to an embodiment.
Figure 5:
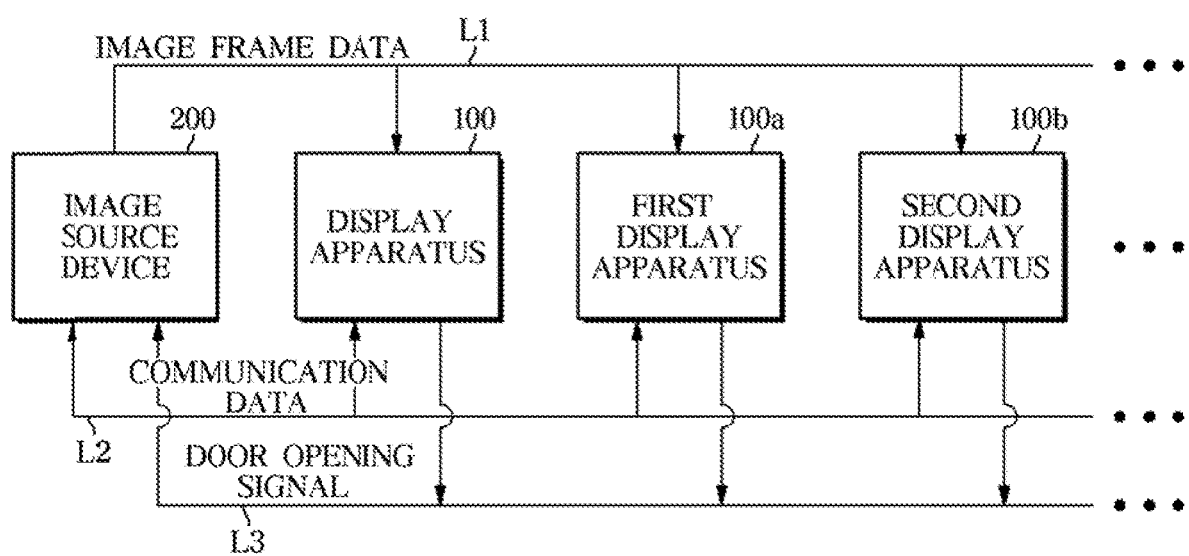
FIG. 5 is a view schematically illustrating the configuration and a signal flow of the display system according to an embodiment.
Figure 7:
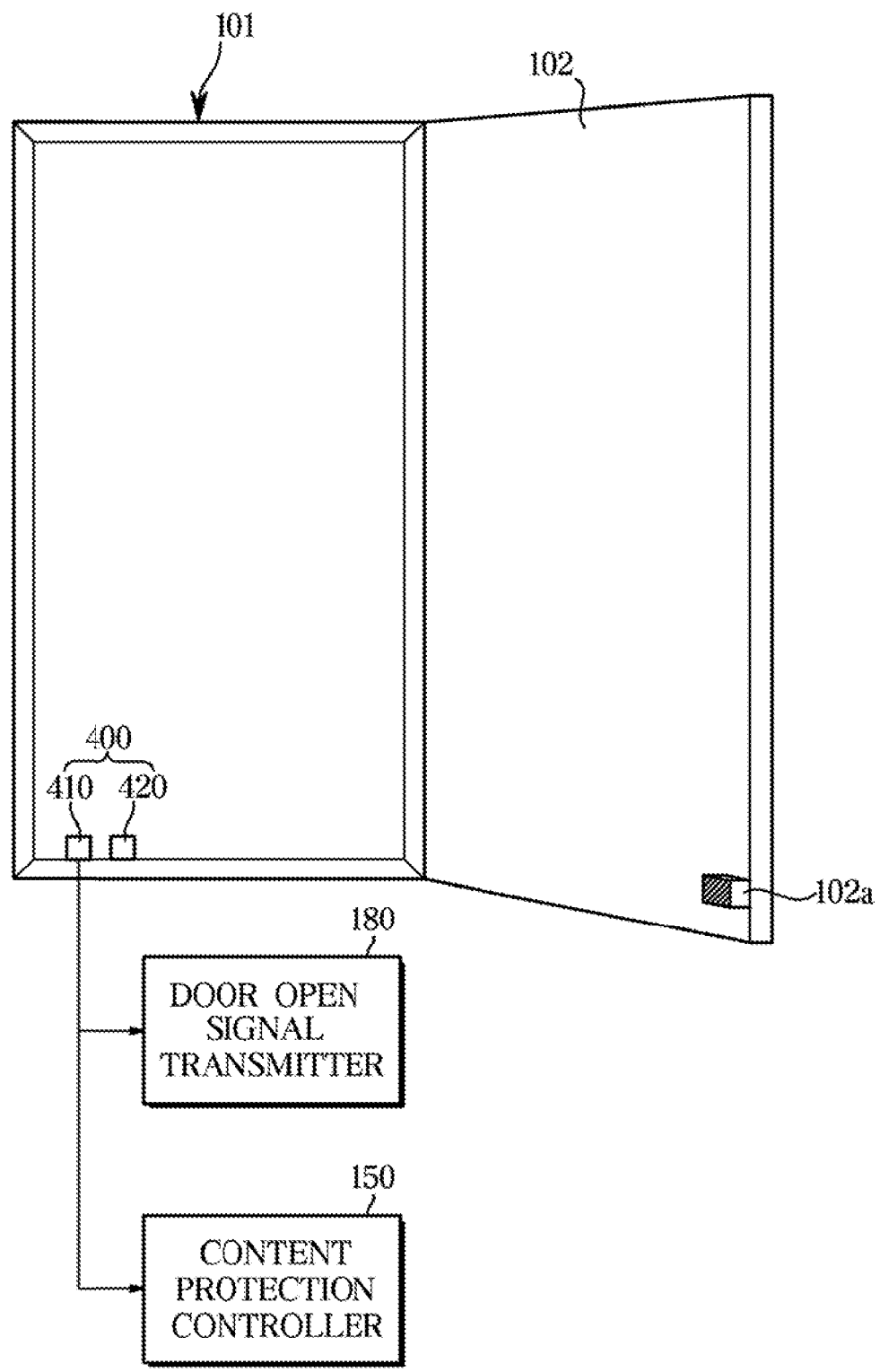
FIG. 7 is a view illustrating another example of the door open detector included in the display apparatus according to an embodiment.

FIG. 2 is a view illustrating a configuration of a display apparatus 100 of the plurality of display apparatuses according to an embodiment. FIG. 3 is an exploded view illustrating a front surface of a display apparatus 100 according to an embodiment. FIG. 4 is a rear view illustrating a display apparatus 100 according to an embodiment. FIG. 5 is a view schematically illustrating a configuration and a signal flow of the display system 1 according to an embodiment. FIGS. 6A and 6B are views illustrating an example of a door open detector which is included in the display apparatus 100 according to an embodiment. FIG. 7 is a view illustrating an example of a door open detector included in the display apparatus 100 according to an embodiment.

The display apparatuses 100a, 100b . . . not described in the plurality of display apparatuses 100 of the display device 10 have the same configuration as the display apparatus 100 and may perform the same function.

Referring to FIGS. 2, 3, 4, 5, 6A, 6B and 7, the display apparatus 100 may include a cabinet 101 which is configured to accommodate the components included in the display apparatus 100.

A display panel 132 may be provided on the front surface of the cabinet 101 to display the image as illustrated in FIG. 3, and a door 102 may be provided on the rear surface of the cabinet 101 to open or close the inside of the cabinet 102 as illustrated in FIG. 4.

A printed board assembly (PBA) 103 may be provided inside the cabinet 101, and various elements and circuits for implementing the functions of the display apparatus 100 may be mounted on the printed board assembly 103.

The display panel 132 may form a part of the screen S and the display panel 132 may display the part of the entire image displayed on the full screen S.

The door 102 may be formed on the opposite side of the display panel 132. For example, the display panel 132 may be provided on the front surface of the cabinet 101, and the door 102 may be provided on the rear surface of the cabinet 101.

The door 102 may be rotatably fixed to the cabinet 101 by a hinge provided at side portion of the cabinet 101 and the inside of the display apparatus 100 may accessed through the door 102.

When the door 102 is closed, the interior of the display apparatus 100 may be inaccessible, and the printed board assembly 103 of the display apparatus 100 may be prevented from being exposed to the outside.

When the door 102 is opened, the printed board assembly 103 of the display apparatus 100 may be accessible to the outside as illustrated in FIG. 4.

The display apparatus 100 may include various configurations for displaying the image and protecting the content. For example, as illustrated in FIG. 2, the display apparatus 100 may include an image data receiver 110, a display controller 120, an image display 130, a door open detector 140, a content protection controller 150, a content protection storage 160, a content protection communicator 170, and a door open signal transmitter 180.

The image data receiver 110 may receive the image frame data from the image source device 200 through the image data transmission line L1 and output the received image frame data to the display controller 120. The image data receiver 110 may include an image receiver configured to receive the image frame data through the image data transmission line L1.

For example, as illustrated in FIG. 5, the display device 10 may include a plurality of display apparatuses 100, such as a first display apparatus 100a, a second display apparatus 100b, and the like. The image data transmission line L1 may be provided between the image source device 200 and the plurality of display apparatuses 100 of the display device 10. The image data transmission line L1 may transmit the image frame data from the image source device 200 to the plurality of display apparatuses 100 of the display device 10.

However, the embodiment is not limited to a case where the image data receiver 110 receives the image frame data through the image data transmission line L1, i.e., by wire. For example, the image frame data may be encrypted by the image source device 200, and the encrypted image frame data may be transmitted wirelessly. The image data receiver 110 may include a receiver antenna configured to receive the image frame data wirelessly.

The display controller 120 may process the image frame data received by the image data receiver 110. The display controller 120 may output the image frame data to the image display 130 and control the image display 130 so that the image frame corresponding to the image frame data is displayed.

The display controller 120 may also obtain the image frame data corresponding to a region where the display apparatus 100 is located within the display device, from the full image frame data received by the image data receiver 110. The display controller 120 may generate a timing control signal for causing the image display 130 to display the image corresponding to the image frame data. The display controller 120 may output the obtained image frame data and the timing control signal to the image display 130.

For example, when the display system 1 includes a display device 10 having sixteen columns and the six rows (as shown in FIG. 1), and a display apparatus 100 is positioned in the first column and the first row, the display controller 120 may obtain the image frame data of the first row and the first column region out of the entire image frame data and output the image frame data of the first row and the first column region to the image display 130.

The display controller 120 may include a microcontroller 121 and a memory 122.

The memory 122 may store programs and data to process the image frame data, and to control the image display 130. In addition, the memory 122 may temporarily store data generated while processing the image frame data and controlling the image display 130. For example, the memory 122 may buffer the image frame data received by the image data receiver 110 or buffer the image frame data output to the image display 130.

The memory 122 may include volatile memory, such as Static Random Access Memory (S-RAM) and Dynamic Random Access Memory (D-RAM), to temporarily store data while power is supplied and non-volatile memory, such as Read Only Memory (ROM) and Erasable Programmable Read Only Memory (EPROM), to store data even if the power supply is interrupted.

The microcontroller 121 may process the image frame data according to the programs stored in the memory 122 and may generate the timing control signal for causing the image display 130 to display the image corresponding to the image frame data. The image frame data and the timing control signal may be output to the image display 130.

The microcontroller 121 may include an operation circuit to perform logic operations and arithmetic operations and a memory circuit to temporarily store computed data.

As described above, the display controller 120 may output the image frame data and the timing control signal to the image display 130 so that the image is displayed at a predetermined timing.

The image display 130 may display the image related to the image frame data and according to the timing control signal output from the display controller 120.

The image display 130 may include the display panel 132 configured to visually display the image and a display driver 131 configured to drive the display panel 132.

The display panel 132 may generate an image based on the image frame data received from the display driver 131 and output the image.

The display panel 132 may include pixels serving as a unit for displaying the image. Each of the pixels may receive an electric signal indicating the image from the display driver 131 and output an optical signal corresponding to the received electrical signal. As described above, the image may be displayed on the display panel 132 by a combination of optical signals output from a plurality of pixels.

The display panel 132 may include a LCD panel, a LED panel, an OLED panel, a Field Emission Display (FED) panel, and the like. However, the embodiment is not limited thereto and may employ any display device capable of visually displaying the image corresponding to the image data.

The display driver 131 may receive the image frame data and the timing control signal from the display controller 120 and drive the display panel 132 according to the timing control signal to display the image frame corresponding to the image frame data. Particularly, the display driver 131 may transmit an electrical signal corresponding to the image frame data to each of the pixels included in the display panel 132 in response to the timing control signal.

When the display driver 231 transmits the electrical signal corresponding to the image frame data to each of the pixels constituting the display panel 132, each of the pixels of the display panel 132 may output light corresponding to the received electrical signal and lights respectively output from the pixels may be combined to generate one image frame.

The door open detector 140 may detect the opening of the door 102 provided on the rear surface of the cabinet 101. When the door 102 is opened, the door open detector 140 may output a door open signal to the door open signal transmitter 180 and the content protection controller 150.

The door open detector 140 may include various door open sensing devices.

For example, the door open detector 140 may include a door switch 300 as illustrated in FIGS. 6A and 6B.

The door switch 300 may include a switch body 310 configured to be in contact with the door 102 and be pushed by the door 102, an elastic member 320 configured to bias the position of the switch body 310, and first, second, third and fourth terminals 331, 332, 333, and 334 connected to the door open signal transmitter 180 and the content protection controller 150, respectively. Specifically, the first terminal 331 and the second terminal 332 may be connected to the door open signal transmitter 180 and the third terminal 333 and the fourth terminal 334 may be connected to the content protection controller 150.

The switch body 310 may include a lower body 312 formed of a conductive material (e.g., metal) that conducts electricity and an upper body 311 formed of a non-conductive material (e.g., synthetic resin) that does not conduct electricity.

When the door 102 is closed, the switch body 310 is disposed at the first position P1, and the door switch 300 may close the circuit including the first terminal 331 and the second terminal 332 and open the circuit including the third terminal 333 and the fourth terminal 334 as shown in FIG. 6A.

When the door 102 is opened, the switch body 310 is disposed at the second position P2, and the door switch 300 may open the circuit including the first terminal 331 and the second terminal 332 and close the circuit including the third terminal 333 and the fourth terminal 334 as shown in FIG. 6B.

When the door 102 is closed, the door 102 may push the switch body 310 downward as shown in FIG. 6A. The switch body 310 may be disposed at the first position P1 by the door 102.

When the door 102 is closed and the switch body 310 is disposed at the first position P1, the lower body 312 of the door switch 300 may be in contact with the first terminal 331 and the second terminal 332. Because the lower body 312 is made of the conductive material, the first terminal 331 and the second terminal 332 may be electrically connected to each other. For example, when the door open signal transmitter 180 applies a predetermined voltage (e.g., voltage of '5V') to the first terminal 331, the voltage applied to the first terminal 331 may be transmitted to the second terminal 332 through the lower body 312 and the predetermined voltage may be output from the second terminal 332 to the door open signal transmitter 180.

As described above, when the door 102 is closed, the door switch 300 may output the voltage (e.g., voltage of '5V') applied to the first terminal 331 to the door open signal transmitter 180. In other words, when the door 102 is closed, the door switch 300 may output a door close signal of the predetermined voltage (e.g., voltage of '5V') to the door open signal transmitter 180.

When the door 102 is opened, the switch body 310 may move to the second position P2 by elastic force of the elastic member 320 as shown in FIG. 6B.

When the door 102 is opened and the switch body 310 is disposed at the second position P2, the lower body 312 of the door switch 300 may be spaced apart from the first terminal 331 and the second terminal 332.

The first terminal 331 and the second terminal 332 may be electrically disconnected from each other. For example, when the door open signal transmitter 180 applies the predetermined voltage (e.g., voltage of '5V') to the first terminal 331, the applied voltage may not be transmitted to the second terminal 332, and a ground voltage (e.g., voltage of '0V') may be output from the second terminal 332 to the door open signal transmitter 180.

As described above, when the door 102 is opened, the door switch 300 may output the ground voltage to the door open signal transmitter 180. In other words, when the door 102 is opened, the door switch 300 may output a door open signal of the ground voltage to the door open signal transmitter 180.

When the door 102 is closed and the switch body 310 is disposed at the first position P1, the lower body 312 of the door switch 300 may be spaced apart from the third terminal 333 and the fourth terminal 334. The third terminal 333 and the fourth terminal 334 may be electrically disconnected from each other. For example, when the content protection controller 150 applies the predetermined voltage (e.g., voltage of '5V') to the third terminal 333, the applied voltage may not be transmitted to the fourth terminal 334, and the ground voltage (e.g., voltage of '0V') may be output from the fourth terminal 334 to the content protection controller 150.

As described above, when the door 102 is closed, the door switch 300 may output the ground voltage to the content protection controller 150. In other words, when the door 102 is closed, the door switch 300 may output the door close signal of the '0V' voltage to the content protection controller 150.

When the door 102 is opened and the switch body 310 is disposed at the second position P2, the lower body 312 of the door switch 300 may be in contact with the third terminal 333 and the fourth terminal 334. Because the lower body 312 is made of the conductive material, the third terminal 333 and the fourth terminal 334 may be electrically connected to each other. For example, when the content protection controller 150 applies the predetermined voltage (e.g., voltage of '5V') to the third terminal 333, the voltage applied to the third terminal 333 may be transmitted to the fourth terminal 334 through the lower body 312 and the predetermined voltage may be output from the fourth terminal 334 to the content protection controller 150.

As described above, when the door 102 is opened, the door switch 300 may output the voltage (e.g., voltage of '5V') applied to the third terminal 333 to the content protection controller 150. In other words, when the door 102 is opened, the door switch 300 may output the door open signal of the voltage of '5V' to the content protection controller 150.

The door open signal (e.g., the '0V' voltage signal) received to the door open signal transmitter 180 and the door open signal (e.g., the '5V' voltage signal) received to the content protection controller 150 may be different from each other, but both signals may indicate opening of the door 102 to the door open signal transmitter 180 and the content protection controller 150, respectively.

As another embodiment, the door open detector 140 may include an infrared sensor 400 as illustrated in FIG. 7.

The infrared sensor 400 may include a light emitting element 410 configured to emit infrared rays and a light receiving element 420 configured to detect infrared rays and output an electrical signal. The light emitting element 410 and the light receiving element 420 may be disposed adjacent to each other as illustrated in FIG. 7.

The door 102 may be provided with a reflective member 102a capable of reflecting light. The reflecting member 102a may be provided at a position where light emitted from the light emitting element 410 can be reflected toward the light receiving element 420 in a state where the door 102 is closed. For example, the reflective member 102a may be disposed on the path of light emitted from the light emitting element 410 with the door 102 closed.

When the door 102 is closed, the reflective member 102a may be disposed on the path of light emitted from the light emitting device 410, and the reflective member 102a may reflect light emitted from the light emitting device 410. Further, the light receiving element 420 may receive light reflected from the reflective member 102a.

In response to receiving the light by the light receiving element 420, the infrared sensor 400 may output the door close signal to the door close signal transmitter 180 and the content protection controller 150.

When the door 102 is opened, the reflective member 102a of the door 102 is moved away from the path of light emitted from the light emitting element 410 and light emitted from the light emitting element 410 may not reach the reflective member 102a. Further, the light receiving element 420 may not receive light emitted from the light emitting element 410.

In response to not receiving light by the light receiving element 420, the infrared sensor 400 may output the door open signal to the door open signal transmitter 180 and the content protection controller 150.

The arrangement of the light emitting element 410 and the light receiving element 420 is not limited to that illustrated in FIG. 7. For example, the light emitting element 410 and the light receiving element 420 may be spaced apart from each other, and the light emitting element 410 may emit light toward the light receiving element 420.

The door 102 may be provided with a light shielding member capable of blocking light. The light shielding member may be disposed at a position where light emitted from the light emitting element 410 can be blocked in a state where the door 102 is closed. For example, the light shielding member may be disposed on the path of light emitted from the light emitting element 410 in a state where the door 102 is closed.

When the door 102 is closed, light emitted from the light emitting element 410 is blocked by the shielding member, and the light receiving element 420 may not receive light. In response to the light receiving element 420 not receiving light, the infrared sensor 400 may output the door close signal to the door open signal transmitter 180 and the content protection controller 150.

When the door 102 is opened, the light receiving element 420 may receive light emitted from the light emitting element 410. In response to receiving light by the light receiving element 420, the infrared sensor 400 may output the door open signal to the door open signal transmitter 180 and the content protection controller 150.

As described above, the door open detector 140 may include various door open sensing devices. Depending on the type of the door open sensing devices, the door open detector 140 may output various door opening signals.

The content protection controller 150 may receive the door opening/closing signal from the door open detector 140 and may determine whether the door 102 provided in the cabinet 101 is opened. Also, the content protection controller 150 may generate the opening/closing status information indicating opening/closing of the door 102 corresponding to the door opening/closing signal.

The content protection controller 150 may periodically output current time and the opening/closing status information indicating the opening/closing of the current door 102 to the content protection storage 160 at predetermined time intervals, and control the content protection storage 160 to store the current time and the opening/closing status information.

For example, while receiving the door close signal from the door open detector 140, the content protection controller 150 may control the content protection storage 160 to store the opening/closing status information (e.g., 'door closing') indicating the closing of the door 102 with the current time.

When receiving the door open signal from the door open detector 140, the content protection controller 150 may control the content protection storage 160 to store the opening/closing status information (e.g., 'door opening') indicating the opening of the door 102 with the current time.

When receiving the door close signal from the door open detector 140 after receiving the door open signal, the content protection controller 150 may control the content protection storage 160 to store the opening/closing status information (e.g., 'closing after opening of the door') indicating closing after opening of the door 102 with the current time.

The content protection controller 150 may include a microcontroller 151 capable of generating opening and closing status information indicating opening/closing of the door 102 according to receiving the door opening/closing signal, and the microcontroller 151 may output the opening/closing status information to the content protection storage 160 together with a storage command.

The content protection storage 160 may periodically receive current time information and opening/closing status information indicating opening/closing of the door 102 from the content protection controller 150 at predetermined time intervals, and may store the current time information and the opening/closing status information. In other words, the content protection storage 160 may store the door opening/closing history including the opening/closing status information and the storage time.

The content protection storage 160 may include the opening/closing status information (e.g., 'door close') indicating closing of the door 102, the opening/closing status information (e.g., 'door open'), and the opening/closing status information (e.g., 'door close after door open') indicating closing after opening of door 102.

The content protection storage 160 may include nonvolatile memory such as flash memory 161 and/or storage media such as magnetic (or optical) disk drive 162 to preserve the door opening/closing history even if the power supply is cut off.

In order to preserve the door opening/closing history, the door opening/closing history stored in the content protection storage 160 may be deleted only by an initialization command of the image source device 200.

The door open detector 140 may detect the opening and closing status of the door 102, the content protection controller 150 may generate the opening and closing status information indicating the opening and closing status of the door 102, and the content protection storage 160 may store the opening/closing status information.

While the display apparatus 100 is not operating, the hacker may open the door 102 of the display apparatus 100 and install a hacking means for obtaining the image frame data and leaking the obtained image frame data. Accordingly, the door open detector 140, the content protection controller 150, and the content protection storage 160 may continuously operate while the display apparatus 100 is not operating. For example, the door open detector 140, the content protection controller 150, and the content protection storage 160 are powered separately from the image data receiver 110, the display controller 120, and the image display 130. The power may be supplied to the door open detector 140, the content protection controller 150, and the content protection storage 160 even when the power supply of the image data receiver 110, the display controller 120, and the image display 130 is cut off.

As a result, even when the display apparatus 100 is not operated, the door open detector 140, the content protection controller 150, and the content protection storage 160 may detect the opening and closing status of the door 102, generate the opening and closing status information indicating the opening and closing status of the door 102, and store the opening/closing status information, respectively.

The content protection communicator 170 may exchange data with the image source device 200.

For example, as illustrated in FIG. 5, a communication data transmission line L2 may be provided between the image source device 200 and the display device 10 including the plurality of display apparatuses 100. The content protection communicator 170 may receive the door opening/closing history request from the image source device 200 through the communication data transmission line L2 and output the door opening/closing history request to the content protection controller 150. The communication data transmission line L2 may transmit communication data between the image source device 200 and the display device 10 including the plurality of display apparatuses 100.

In response to the door opening/closing history request, the content protection controller 150 may read the door opening/closing history from the content protection storage 160. The door opening/closing history may include the opening/closing status information indicating opening/closing of the door 102 with the lapse of time and storage time of the opening/closing status information.

The content protection controller 150 may output the door opening and closing history along with a transmission command to the content protection communicator 170. The content protection communicator 170 may transmit the door opening and closing history through the communication data transmission line L2 to the image source device 200.

The content protection communicator 170 may include a transceiver for exchanging data with the image source device 200.

In FIG. 2, the content protection communicator 170 and the image data receiver 110 are illustrated separately, but the embodiment is not limited thereto. In some cases, the content protection communicator 170 and the image data receiver 110 may be integrally provided, and the image data transmission line L1 and the communication data transmission line L2 may be integrally provided. For example, the content protection controller 150 may receive the door opening/closing history request from the image source device 200 through the image data receiver 110 and transmit the opening/closing history of the door to the image source device 200.

The door open signal transmitter 180 may receive the door opening/closing signal from the door open detector 140 and may transmit the door opening/closing signal to the image source device 200.

For example, as illustrated in FIG. 5, a door open signal transmission line L3 may be provided between the image source device 200 and the plurality of display apparatuses 100. The door open signal transmitter 180 may transmit the door opening/closing signal to the image source device 200 through the door open signal transmission line L3.

The door open signal transmission line L3 may be provided separately from the image data transmission line L1 and the communication data transmission line L2. The door opening signal indicating that any one of the plurality of display apparatuses 100 is opened may be transmitted to the image source device 200. In other words, when the display apparatus 100 is opened, the display apparatus 100 may transmit the door opening signal to the image source device

200 through the door open signal transmission line L3. Also, the image source device 200 may detect the opening of any one of the plurality of display apparatuses 100 from the door opening signal received through the door open signal transmission line L3. Thereafter, the image source device 200 may determine whether the system is intruded, and may stop transmission of the image frame data through the image data transmission line L1 according to the determination result.

The door open signal transmitter 180 may include various signal transmission means. For example, the door open signal transmitter 180 may be implemented as a connector for transmitting the door opening/closing signal of the door open detector 140 to the image source device 200. In other words, the door open signal transmitter 180 may only connect between the door open signal transmission line L3 and the display apparatus 100.

When the door open detector 140 includes the door switch 300, the door switch 300 may directly output the door opening/closing signal to the image source device 200 through the door open signal transmitter 180 and the door open signal transmission line L3. The door switch 300 and the image source device 200 may be directly connected through the door open signal transmission line L3 and may form a single wire circuit.

The image source device 200 may apply a predetermined voltage (e.g., a voltage of '5V') and the predetermined voltage may be applied to the door switch 300 through the door open signal transmission line L3 and the door open signal transmitter 180.

When the door 102 is closed, the predetermined voltage passes through the door switch 300 and may be applied to the image source device 200 through the door open signal transmitter 180 and the door open signal transmission line L3. In other words, the door switch 300 may output the door closing signal of the predetermined voltage to the image source device 200.

When the door 102 is opened, the predetermined voltage may be cut off by the door switch 300, and a ground voltage (e.g., a voltage signal of '0V') may be applied to the image source device 200 through the door open signal transmitter 180 and the door open signal transmission line L3. In other words, the door switch 300 may output the door opening signal of the ground voltage to the image source device 200.

When the door open detector 140 includes the infrared sensor 400, the infrared sensor 400 may directly output the door opening/closing signal to the image source device 200 through the door open signal transmitter 180 and the door open signal transmission line L3. The infrared sensor 400 and the image source device 200 may be directly connected through the door open signal transmission line L3 and may form the single wired circuit.

In particular, the door opening/closing signal output from the infrared sensor 400 may be directly input to the image source device 200 through the door open signal transmitter 180 and the door open signal transmission line L3.

As another example, the door open signal transmitter 180 may be implemented as communication means for transmitting a communication signal to the image source device 200 in response to the door opening/closing signal of the door open detector 140.

When the door open detector 140 includes the door switch 300, the door open signal transmitter 180 may apply the predetermined voltage to the door switch 300 and receive the output voltage of the door switch 300. The door open signal transmitter 180 may also transmit a first communication signal indicating the door opening or a second communication signal indicating the door closing to the image source device 200 according to the output voltage of the door switch 300. In other words, the door open signal transmitter 180 may transmit the first communication signal in response to the door opening signal and the second communication signal in response to the door closing signal. The image source device 200 may receive the first communication signal or the second communication signal from the door open signal transmitter 180.

When the door open detector 140 includes the infrared sensor 400, the door open signal transmitter 180 may receive the output signal of the infrared sensor 400 and output the first communication signal indicating the door closing or the second communication signal indicating the door closing, to the image source device 200 according to the output signal of the infrared sensor 400.

As such, the door open signal transmitter 180 may include various transmission means and may transmit various types of signals to the image source device 200 according to the type of transmission means.

As described above, the display apparatus 100 may receive the image frame data from the image source device 200 and display an image corresponding to the image frame data. The display apparatus 100 may detect the opening of the door 102 installed in the cabinet 101 for protecting the contents and transmit the door opening signal to the image source device 200 according to the opening of the door 102.

Figure 8:
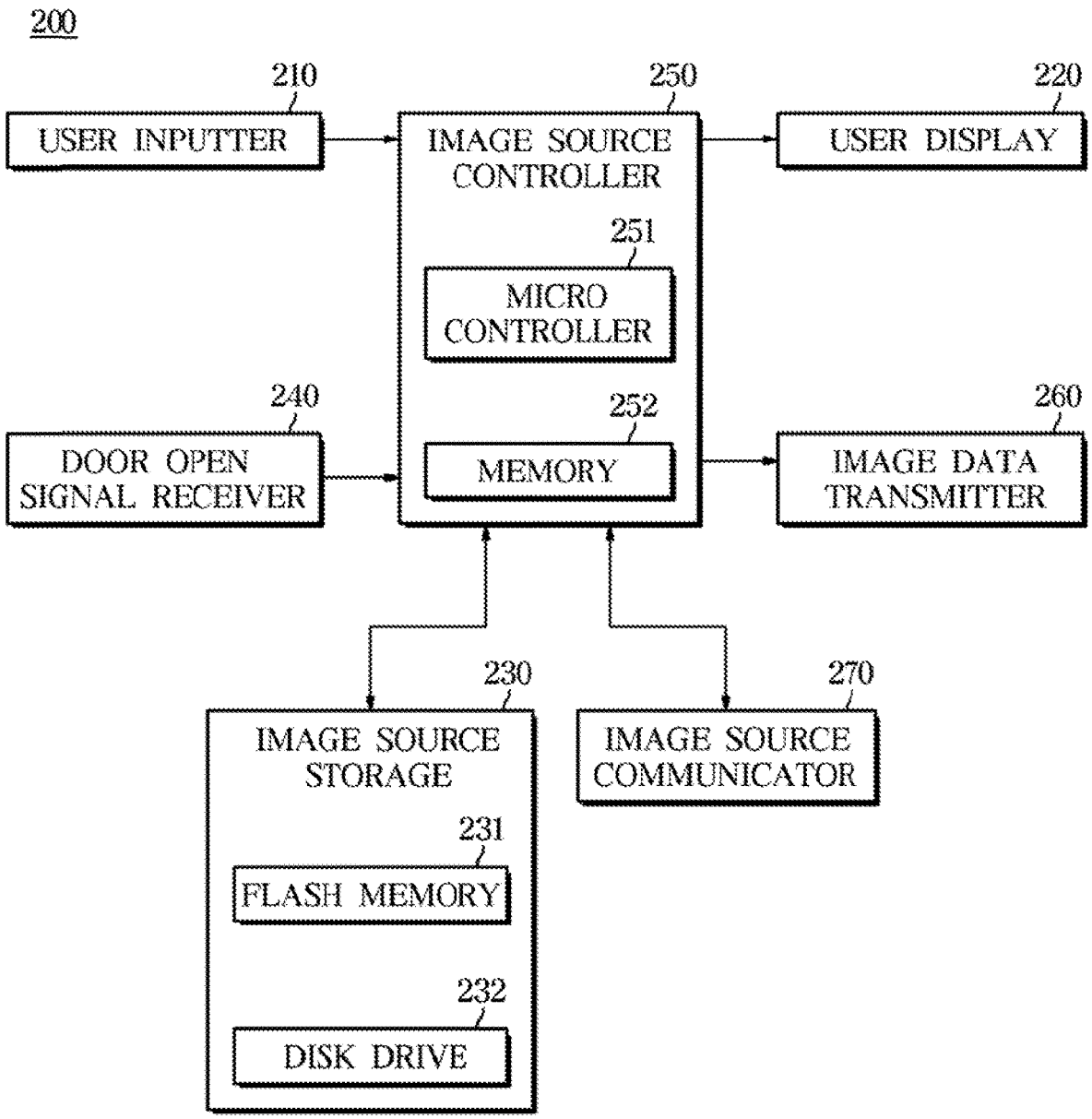
FIG. 8 is a view illustrating the configuration of an image source device according to an embodiment.

FIG. 8 is a view illustrating the configuration of an image source device according to an embodiment.

Referring to FIG. 8, the image source device 200 may include a user inputter 210, a user display 220, an image source storage 230, a door open signal receiver 240, an image source controller 250, an image data transmitter 260, and an image source communicator 270.

The user inputter 210 may receive user input from a user and output an electrical signal corresponding to the user input to the image source controller 250.

The user inputter 210 may be implemented by various input devices. For example, the user inputter 210 may include an operation button for receiving predetermined commands (for example, operation start, operation stop, etc.), a keypad for receiving characters, numbers, symbols, a pointing device (e.g., a mouse, a trackball, a digitizer, a touch pad, etc.) for receiving coordinate values in the screen, and the like.

The user display 220 may display the image corresponding to the user input or may display the image indicating operation information of the display system 1.

The user display 220 may be provided separately from the display device 10. In particular, the display device 10 may play the video contained in the content, while the user display 220 may display information about the operation of the image source device 200 and the display device 10.

The user display 220 may be implemented with various display devices such as a cathode ray tube display, a liquid crystal display, a light emitting diode organic light emitting diode panel, and the like.

In addition, the user inputter 210 and the user display 220 may be provided integrally with the image source device 200 as well as separately from the image source device 200.

For example, a user terminal including the user inputter 210 and the user display 220 may be provided. The user terminal may receive the user input from the user and may transmit the user input to the image source device through communication. Also, the user terminal may receive the operation information of the display system 1 from the image source device, and may display the image indicating the operation of the display system 1.

The image source storage 230 may store programs and data to control the operation of the image source device 200. For example, the image source storage 230 may store an operating system (OS) for managing resources (e.g., software and hardware) included in the image source device 200, a video player program for decoding the content data and restoring the image frame data, a maintenance/repair program for managing the display device 10, a content protection program for preventing content leakage, and the like.

In addition, the image source storage 230 may store a file including the content data played by display device 10 including the plurality of display apparatuses 100. The file of the content data may be encrypted and stored for security.

The image source storage 230 may include non-volatile memory such as flash memory 231 and/or storage media such as magnetic (or optical) disk drive 232 to preserve the stored program and data even if the power supply is cut off.

The door open signal receiver 240 may receive the door opening/closing signal from the display apparatus 100 through the door open signal transmission line L3 and output the door opening/closing signal to the image source device 200.

The door open signal receiver 240 may include various signal receiving means according to the door open signal transmitter 180 described above.

For example, if the door open signal transmitter 180 of the display apparatus 100 is implemented as the connector, the door open signal receiver 240 may also be implemented as the connector for receiving the door opening/closing signal of the display apparatus 100. In other words, the door open signal receiver 240 may only connect between the door open signal transmission line L3 and the image source device 200.

When the door open detector 140 of the display apparatus 100 includes the door switch 300, the door opening/closing signal from the door switch 300 may be transmitted to the image source controller 250 through the door open signal transmitter 180, the door open signal transmission line L3 and the door open signal receiver 240. In other word, the single wire circuit from the door switch 300 to the image source controller 250 may be formed.

The image source controller 250 may apply the predetermined voltage (e.g., a voltage of '5V') to the door open signal receiver 240 and the predetermined voltage may be applied to the door switch 300 through the door open signal receiver 240, the door open signal transmission line L3 and the door open signal transmitter 180.

When the door 102 is closed, the predetermined voltage passes through the door switch 300 and may be applied to the image source controller 250 through the door open signal transmitter 180, the door open signal transmission line L3 and the door open signal receiver 240. In other words, the door switch 300 may output the door closing signal of the predetermined voltage to the image source controller 250.

When the door 102 is opened, the predetermined voltage may be cut off by the door switch 300 and the ground voltage (e.g., a voltage signal of '0V') may be applied to the image source controller 250 through the door open signal transmitter 180, the door open signal transmission line L3 and the door open signal receiver 240. In other words, the door switch 300 may output the door opening signal of the ground voltage to the image source controller 250.

In addition, when the door open detector 140 of the display apparatus 100 includes the infrared sensor 400, the door opening/closing signal output from the infrared sensor 400 may be transmitted to the image source controller 250 through the door open signal transmitter 180, the door open signal transmission line L3 and the door open signal receiver 240. In other word, the single wire circuit from the infrared sensor 400 to the image source controller 250 may be formed.

In particular, the door opening/closing signal output from the infrared sensor 400 may be directly input to the image source controller 250 through the door open signal transmitter 180, the door open signal transmission line L3 and the door open signal receiver 240.

In addition, the door open signal receiver 240 may apply the predetermined voltage (e.g., a voltage of '5V') to the door open signal transmission line L3, and the predetermined voltage may be applied to the door switch 300 through the door open signal transmission line L3 and the door open signal transmitter 180.

Depending on the opening and closing of the door 102, the predetermined voltage may be applied to the door open signal receiver 240 through the door open signal transmission line L3 or the ground voltage (for example, '0V' voltage) may be applied to the door open signal receiver 240. In other word, the door switch 300 may output the door opening/closing signal to the door open signal receiver 240.

In response to receiving the door opening/closing signal of the door switch 300, the door open signal receiver 240 may output the door opening/closing signal to the image source controller 250.

Alternatively, if the door opening signal transmitter 180 of the display apparatus 100 is implemented as communication means for transmitting the communication signal, the door open signal receiver 240 may also be the communication means for receiving the communication signal of the display apparatus 100.

The door open signal transmitter 180 may transmit the first communication signal indicating the door opening or the second communication signal indicating the door closing in response to the door opening/closing signal of the door open detector 140. For example, the door open signal transmitter 180 may transmit the first communication signal in response to the door opening signal and may transmit the second communication signal in response to the door closing signal.

The door open signal receiver 240 may receive the first communication signal or the second communication signal and may output the door opening/closing signal to the image source controller 250. For example, the door open signal receiver 240 may output the door opening signal to the image source controller 250 in response to receiving the first communication signal, and may output the door closing signal to the image source controller 250 in response to receiving the second communication signal. As such, the door open signal receiver 240 may include various receiving means, and may receive various types of signals from the display apparatus 100 according to the type of receiving means.

The image source controller 250 may decode the content data stored in the form of file in the image source storage 230 into image frame data and output the image frame data to the image data transmitter 260. For example, the image source controller 250 may decode the content data using various video compression standards such as MPEG, HEVC, and the like.

The image source controller 250 may receive the door opening/closing signal through the door open signal receiver 240 and perform the operation for protecting video contents when the doors 102 provided in the display device 10 are opened. For example, the image source controller 250 may receive the door opening/closing history from the plurality of display apparatuses 100 through the image source communicator 270, and identify which display apparatus in which the door 102 is opened based on the received door opening/closing history. Thereafter, the image source controller 250 may determine whether the door 102 is opened due to external intrusion, and may stop the transmission of the image frame data to the plurality of display apparatuses 100 when it is determined that the door 102 is opened due to external intrusion. Thereafter, when the external intrusion is eliminated or terminated, the image source controller 250 may resume the transmission of the image frame data to the display device 10 including the plurality of display apparatuses 100.

The image source controller 250 may include a microcontroller 251 and a memory 252.

The memory 252 may store programs and data for decoding the content data and protecting the content data, and may temporarily store data that occurs while the operation of decoding the content data and protecting the content data. For example, the memory 252 may buffer the content data or buffer the decoded image frame data.

The memory 252 may include volatile memory, such as Static Random Access Memory (S-RAM) and Dynamic Random Access Memory (D-RAM) to temporarily store data, while power is supplied, and non-volatile memory, such as a Read Only Memory (ROM) and Erasable Programmable Read Only Memory (EPROM), to store data even if power supply is cut off.

The microcontroller 251 may decode the content data according to the programs stored in the memory 252, and may generate a control signal for protecting the content data. The decoded image frame data may be output to the image data transmitter 260, and the control signal for protecting the content data may be output to the image source communicator 270.

The microcontroller 251 may include the operation circuit to perform logic operations and arithmetic operations and the memory circuit to temporarily store computed data.

The image data transmitter 260 may receive the image frame data from the image source controller 250 and output the image frame data to the display device 10 including the plurality of display apparatuses 100 through the image data transmission line L1. The image data transmitter 260 may include a transmitter for transmitting the image frame data through the image data transmission line L1 (see FIG. 5).

However, the embodiment is not limited to a case in which the image data transmitter 260 transmits the image frame data through the image data transmission line L1 (see FIG. 5), that is, by wire. For example, the image frame data may be encrypted by the image source controller 250, and the encrypted image frame data may be transmitted wirelessly by the image data transmitter 260. The image data transmitter 260 may include a transmit antenna for transmitting the image frame data wirelessly.

The image source communicator 270 may exchange data with each of the plurality of display apparatuses 100.

For example, the image source communicator 270 may receive a door opening/closing history request command from the image source controller 250 and may transmit the door opening/closing history request to the plurality of display apparatuses 100.

In response to the door opening/closing history request, each of the plurality of display apparatuses 100 may transmit the door opening/closing history to the image source communicator 270, and the image source communicator 270 may output the door opening/closing history of the plurality of display apparatuses 100 to the image source controller 250.

The image source communicator 270 may include the transceiver for exchanging data with the display device 10 including the plurality of display apparatuses 100.

In FIG. 8, the image source communicator 270 and the image data transmitter 260 are illustrated separately, but the embodiment is not limited thereto. The image source communicator 270 and the image data transmitter 260 may be integrally provided. The image data transmission line L1 (see FIG. 5) and the communication data transmission line L2 (see FIG. 5) may also be integrally provided. For example, the image source controller 250 may transmit the door opening/closing history request to the display device 10 including the plurality of display apparatuses 100 through the image data transmitter 260 and receive the door opening/closing history from the plurality of display apparatuses 100 through the image data receiver 110.

As described above, the image source device 200 may decode the content data and transmit the image frame data to the plurality of display apparatuses 100. In addition, the image source device 200 may perform various operations for protecting contents according to the door opening/closing signal output from the plurality of display apparatuses 100.

The operation for content protection will be described in detail below.

Figure 9:
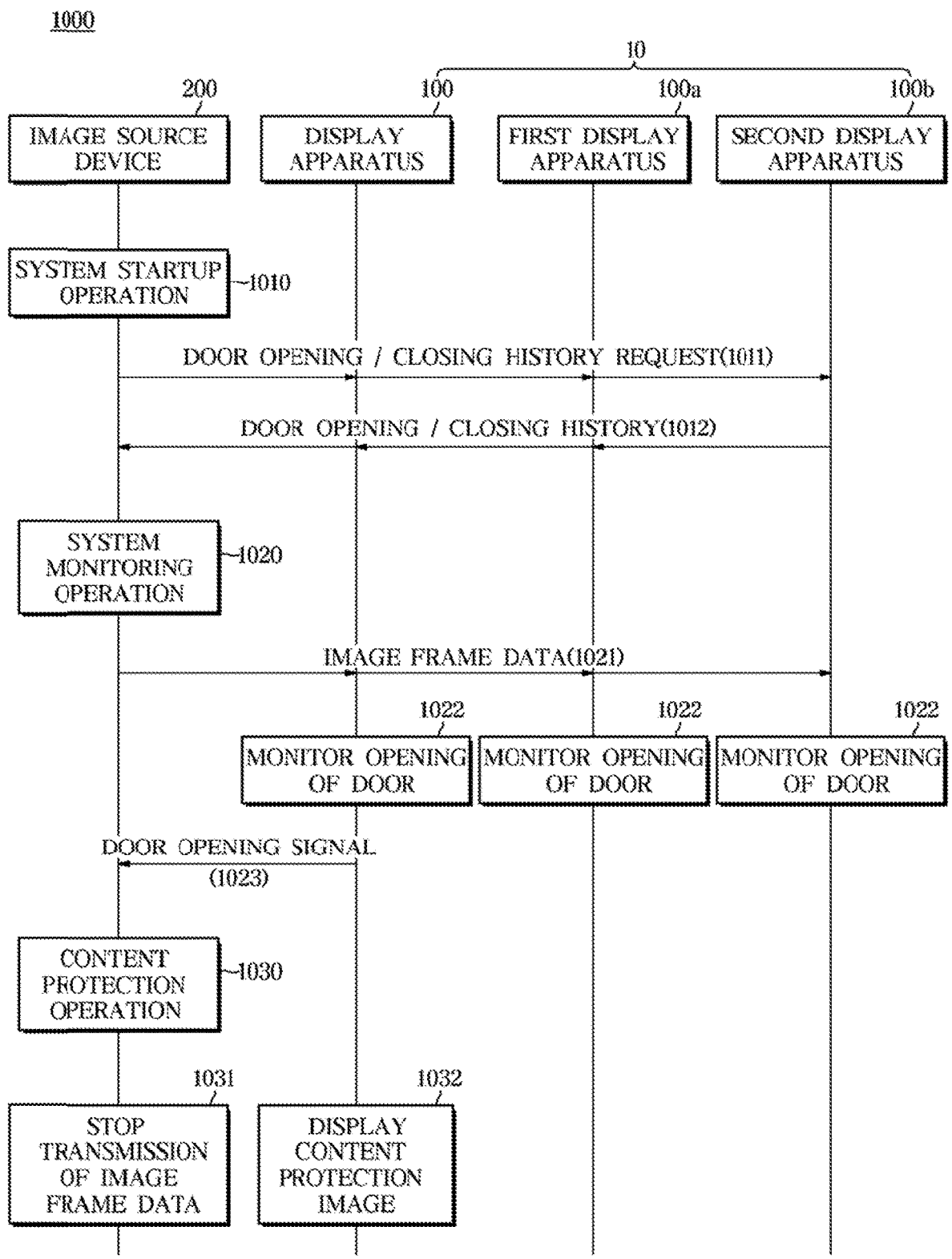
FIG. 9 is a view illustrating an operation of the display system according to an embodiment.

FIG. 9 is a view illustrating an operation (1000) of the display system according to an embodiment.

As illustrated in FIG. 9, the display system 1 may include the image source device 200 and the display device 10. The display device may include display apparatuses 100 such as the first display apparatus 100a, the second display apparatus 100b, and the like.

When the operation of the display system 1 is started, the image source device 200 may perform the system startup operation (1010).

While the display system startup (1010), the image source device 200 may check the display device 10 including the plurality of display apparatuses 100.

In particular, the image source device 200 may request the door opening/closing history to the plurality of display apparatuses 100 (1011), and may receive the door opening/closing history from each of the plurality of display apparatuses 100 (1012). Each of the plurality of display apparatuses 100 may detect the opening of the door 102 even while the display system 1 is not operating, and may store status information about the opening and closing of the door 102. The image source device 200 may check the door opening/closing history of the plurality of display apparatuses 100 to determine an unauthorized intrusion of the system that may occur while the display system 1 is not operating.

In addition, the image source device 200 may determine whether each of the plurality of display apparatuses 100 is opened based on the door opening/closing history of the plurality of display apparatuses 100. In particular, the image source device 200 may determine the opening of the door 102 or the closing after the opening of the door 102 from the door opening/closing history.

When the opening of the door 102 or the closing after the opening of the door 102 is not determined, the image source device 200 may perform a system monitoring operation that monitors the system while playing the content (1020).

During the system monitoring operation (1020), the image source device 200 may transmit the image frame data to the plurality of display apparatuses 100 (1021). Each of the plurality of display apparatuses 100 may receive the image frame data and may display the image corresponding to the image frame data.

Each of the plurality of display apparatuses 100 may monitor the opening of the door 102 provided in the cabinet 101 while displaying the image (1022). For example, the cabinet 101 may be provided with the door open detector 140 for detecting the opening and closing of the door 102, and the door open detector 140 may detect opening of the door 102.

Upon detecting the opening of the door 102, the display apparatus 100 may transmit the door opening signal to the image source device 200 (1023). For example, upon detecting the opening of the door 102, the door open detector 140 may transmit the door opening signal to the image source device 200.

When the door opening signal is received, the image source device 200 may perform the content protection operation to stop the playback of the content (1030). The image source device 200 may also perform the content protection operation (1030) when the opening of the door 102 or the closing after the opening of the door 102 is determined during the system startup operation (1010).

During the content protection operation (1030), the image source device 200 may stop the transmission of the image frame data to the plurality of display apparatuses (1031). The image display of the plurality of display apparatuses 100 may also be stopped due to the stopping of the transmission of the image frame data. In addition, the display apparatus in which the door 102 is opened during the content protection operation (1030) may display the predetermined content protection image (1032).

As described above, the display system 1 may play the content and monitor the opening of the door 102 during playback of the content. When the opening of the door 102 is detected, the display system 1 may stop the playback of the content for protection of the content.

Figure 10:
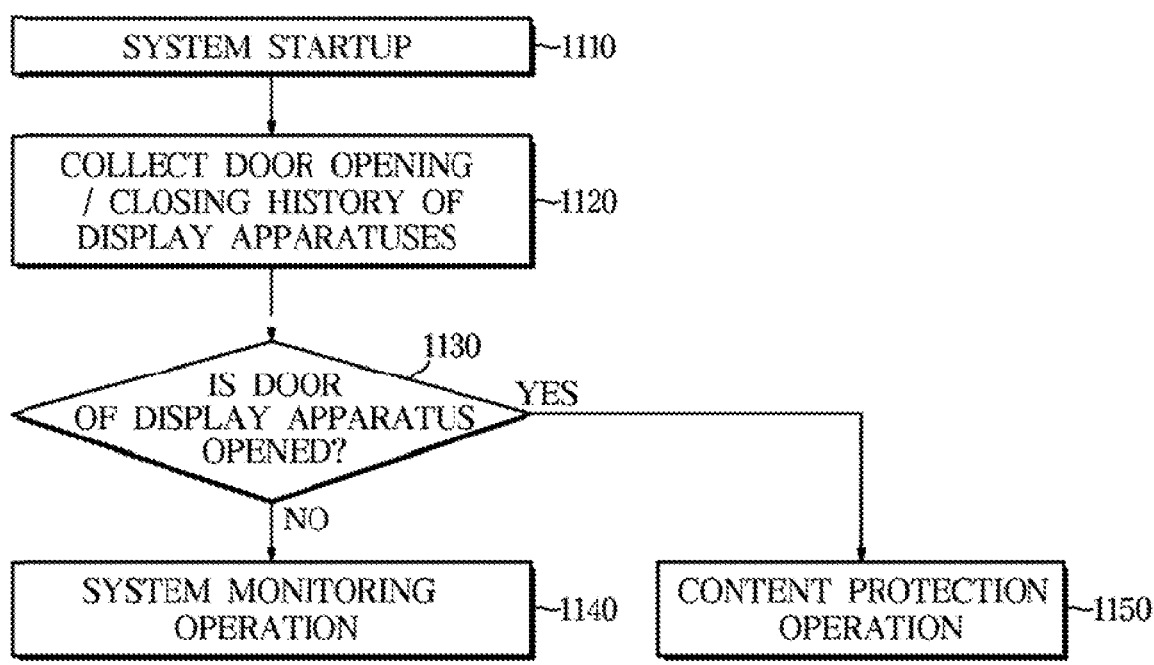
FIG. 10 is a view illustrating a system startup operation of the image source device according to an embodiment.

FIG. 10 is a view illustrating a system startup operation (1100) of the image source device according to an embodiment.

Referring to FIG. 10, the image source device 200 may start system startup (1110).

The image source device 200 may start operation by the user input. For example, while the display system 1 is not playing the content, the image source device 200 may be powered off or operating in a standby mode. The image source device 200 may be powered on by the user input or the image source device 200 may be switched from the standby mode to an active mode.

The image source device 200 may start system startup when the power is turned on or when the mode is switched to the active mode Thereafter, the image source device 200 may collect the door opening/closing history from the plurality of display apparatuses 100 (1120).

During the system startup, the image source controller 250 of the image source device 200 may check the operation of the configurations of the image source device 200. For example, the image source controller 250 may check the operation of the user inputter 210, the user display 220, the image source storage 230, the door open signal receiver 240, the image data transmitter 260, and the image source communicator 270.

In addition, the image source controller 250 may check for intrusion into the display device 10 including the plurality of display apparatuses 100 to protect the contents.

In particular, the image source controller 250 may check whether or not the door 102 provided in the display device 10 including the plurality of display apparatuses 100 is opened. The image source controller 250 may control the image source communicator 270 to transmit the door opening and closing history request to the plurality of display apparatuses 100. The image source communicator 270 may transmit the door opening/closing history request to the plurality of display apparatuses 100 according to control of the image source controller 250.

Each of the plurality of display apparatuses 100 may detect the opening of the door 102 and store the status information about the opening and closing of the door 102 even while the display system 1 is not operating. Power is supplied to the door open detector 140, the content protection controller 150, and the content protection storage 160 even while the display system 1 is not operating. Accordingly, the door open detector 140 may output the door opening signal in response to the opening of the door 102, and the content protection controller 150 may transmit status information indicating 'door open' the content protection storage 160.

The content protection controller 150 of the display apparatus 100 may receive the door opening/closing history request from the image source device 200 through the content protection communicator 170 during the system startup operation, and may read the door opening/closing history from the content protection storage 160 in response to the door opening/closing history request. In addition, the content protection controller 150 may transmit the read door opening/closing history to the image source device 200 through the content protection communicator 170.

The image source controller 250 may receive the door opening/closing history from the display device 10 including the plurality of display apparatuses 100 through the image source communicator 270.

Thereafter, the image source device 200 may determine whether the doors of the plurality of display apparatuses 100 are opened (1130).

The door opening/closing history may include opening/closing status information indicating opening/closing of the door 102 with the lapse of time and storage time of the opening/closing status information. The opening/closing status information may include status information indicating the door closing, status information indicating the door opening, and status information indicating the closing after opening the door.

The image source controller 250 may search for status information indicating 'door opening' or 'closing after door opening' in the door opening/closing history of the plurality of display apparatuses 100.

When the status information indicating 'door opening' or 'closing after door opening' is found in the door opening/closing history, the image source controller 250 may determine that the doors 102 of the plurality of display apparatuses 100 that has transmitted the door opening/closing history including status information of 'door opening' are opened, and may determine that the door 102 of the display apparatus 10 that has transmitted the door opening/closing history including status information of 'closing after door opening' are closed after opening.

When the status information indicating 'door opening' or 'closing after door opening' is not found in the door opening/closing history, the image source controller 250 may determine that the doors 102 of the plurality of display apparatuses 100 are not opened.

When it is determined that the doors 102 of the plurality of display apparatuses 100 are not opened (NO in 1130), the image source device 200 may perform the system monitoring operation (1140).

During the system monitoring operation, the image source device 200 may transmit the image frame data to the display device 10 including the plurality of display apparatuses 100. Each of the plurality of display apparatuses 100 may receive the image frame data and may display the image corresponding to the image frame data.

Each of the plurality of display apparatuses 100 may monitor the opening of the door 102 provided in the cabinet 101 while displaying the image, and upon detecting that the door 102 is opened, the display apparatus 100 may transmit the door opening signal to the image source device 200.

The system sensing operation of image source device 200 is described in more detail below.

When it is determined that the door 102 of any one of the plurality of display apparatuses 100 is open (YES in 1130), the image source device 200 may perform the content protection operation (1150).

During the content protection operation, the image source device 200 may stop the transmission of the image frame data to the plurality of display apparatuses 100, and the display apparatus in which the door 102 is opened may display the predetermined content protection image.

The content protection operation of the image source device 200 is described in more detail below.

As described above, the image source device 200 may check the door opening/closing history of the plurality of display apparatuses 100 for protecting the contents when the system is started.

Figure 11:
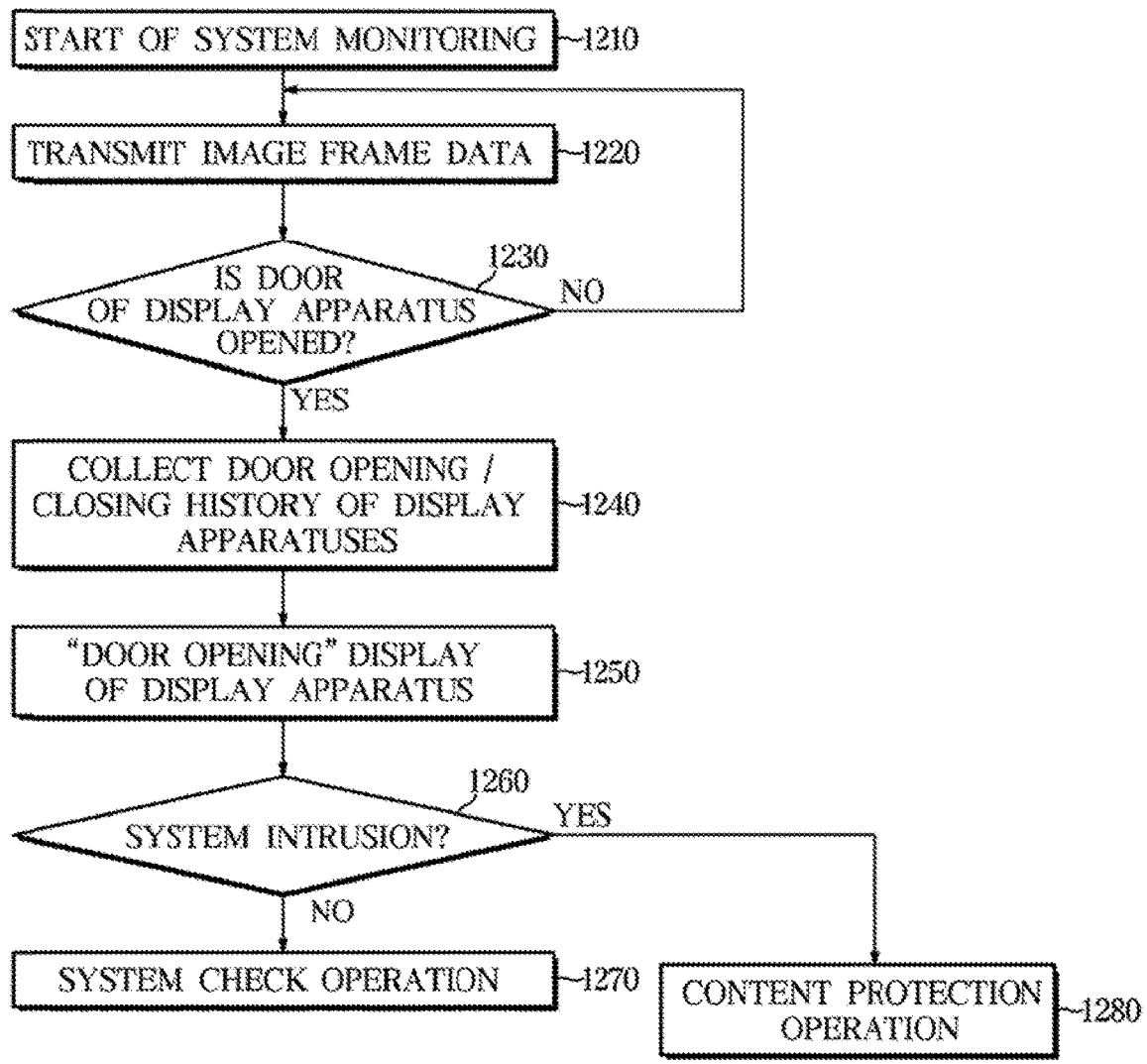
FIG. 11 is a view illustrating a system monitoring operation of the image source device according to an embodiment.
Figure 12:
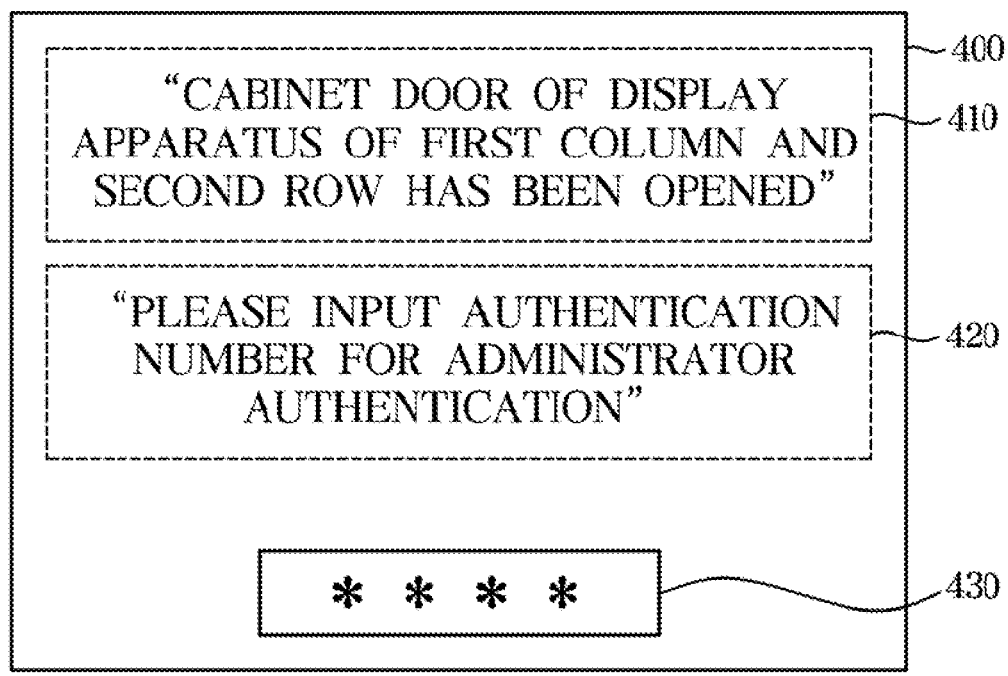
FIG. 12 is a view illustrating a screen for determining an authorized or unauthorized system intrusion during a system detection operation shown in FIG. 11.

FIG. 11 is a view illustrating a system monitoring operation (1200) of the image source device according to an embodiment, and FIG. 12 is a view illustrating a screen for determining an authorized or unauthorized system intrusion during a system detection operation shown in FIG. 11.

Referring to FIGS. 11 and 12, the image source device 200 may start system monitoring (1210).

When the status information indicating 'door opening' or 'closing after door opening' is not found in the door opening/closing history of the plurality of display apparatuses 100, the image source device 200 may perform the system monitoring operation.

The image source device 200 may transmit the image frame data to the plurality of display apparatuses 100 (1220).

The image source controller 250 of the image source device 200 may decode content data stored in the form of file in the image source storage 230 into image frame data. Thereafter, the image source controller 250 may transmit the image frame data to the plurality of display apparatuses 100 through the image data transmitter 260.

The image corresponding to the image frame data may be displayed by the display device 10 including the plurality of display apparatuses 100 while the image source device 200 transmits the image frame data.

During transmission of the image frame data, the image source device 200 may determine whether the doors 102 of the plurality of display apparatuses 100 are opened (1230).

Each of the plurality of display apparatuses 100 may include the door open detector 140 for detecting the opening of the door 102. The door open detector 140 may be provided in each of the plurality of display apparatuses 100 and may detect the opening of the door 102 and output the door opening signal to the image source device 200.

The image source controller 250 may receive the door opening signal output from the door open detector 140 of each of the plurality of display apparatuses 100 through the door open signal receiver 240 and may determine whether the doors of the plurality of display apparatuses 100 are opened based on the door opening signal.

When the door opening signal is received through the door open signal receiver 240, the image source controller 250 may determine that the door 102 provided in any one of the plurality of display apparatuses 100 is opened.

When the door closing signal is received through the door open signal receiver 240, the image source controller 250 may determine that the doors 102 of the display device 10 including the plurality of display apparatuses 100 are not opened.

When it is determined that the doors 102 of the display device 10 including the plurality of display apparatuses 100 are not opened (NO in 1230), the image source device 200 may continuously transmit the image frame data and repeat the determination of whether or not the doors of the display device 10 including the plurality of display apparatuses 100 are opened.

When it is determined that the door 1002 of any one of the plurality of display apparatuses 100 is opened (YES in 1230), the image source device 200 may collect the door opening/closing history of the plurality of display apparatuses 100 (1240).

Because the door opening signal does not include the identification information of the display apparatus, the image source controller 250 may not be able to identify the display apparatus in which the door 102 among the plurality of display apparatuses 100 is opened.

For example, when the door switch 300 is directly connected to the image source controller 250 through the door open signal receiver 240, the door open signal transmission line L3 and the door open signal transmitter 180, the door opening signal ('5V' voltage signal or '0V' voltage signal) output from the door switch 300 may not include the identification information of the display apparatus.

Accordingly, the image source controller 250 may transmit the door opening/closing history request to the plurality of display apparatuses 100 through the image source communicator 270.

Each of the plurality of display apparatuses 100 may detect the opening of the door 102 and store the status information on the opening and closing of the door 102 while displaying the image corresponding to the image frame data. For example, the door open detector 140 may output the door opening signal in response to opening of the door 102, and the content protection controller 150 may store status information indicating 'door opening' in the content protection storage 160 in response to the door opening signal.

While displaying the image, the content protection controller 150 may receive the door opening/closing history request from the image source device 200 through the content protection communicator 170 and read the door opening/closing history request from the content protection storage 160 in response to the door opening/closing history request. In addition, the content protection controller 150 may transmit the read door opening/closing history to the image source device 200 through the content protection communicator 170.

The image source controller 250 may receive the door opening/closing history from the display device 10 including the plurality of display apparatuses 100 through the image source communicator 270.

Thereafter, the image source device 200 may display a marker indicating the door opening of the display apparatus 100 to the user (or administrator) (1250).

The door opening/closing history received through the image source communicator 270 may be received together with the identification information of the display apparatus that transmitted the door opening/closing history.

The image source controller 250 may identify the display apparatus which transmitted the door opening/closing history based on the identification information of the display apparatus that is received together with the door opening/closing history, and determine whether or not the door of the corresponding display apparatus is opened based on the door opening/closing history. For example, when the door of the first display apparatus 100*a* is opened, the image source controller 250 may identify the first display apparatus 100*a* based on the identification information received through the image source communicator 270 and may determine whether the door 102 of the first display apparatus 100*a* is opened based on the door opening/closing history.

In this way, when the display apparatus in which the door 102 is opened is identified, the image source controller 250 may display a message indicating the identification information (or disposed position) of the display apparatus in which the door 102 is opened and a message indicating the opening of the door 102 of the display apparatus, on the user display 220. For example, the image source controller 250 may display a screen 400 including a door open warning message 410 of "the cabinet door of the display apparatus in the first row and the second column is opened" on the user display 220 as illustrated in FIG. 12.

The user (or administrator) may recognize the door opening of the display apparatus through the message displayed on the user display 220.

Thereafter, the image source device 200 may determine whether the door opening is an unauthorized system intrusion (1260).

The hacker may open the door 102 of the display apparatus 100 for the content leakage and the user (or administrator) may open the door 102 to check the display apparatus 100.

Accordingly, when the door 102 of the display apparatus 100 is opened, the image source controller 250 may determine whether the door 102 has been opened by the hacker for the content leakage or whether the door 102 has been opened by the user (or administrator) for checking of the display apparatus 100. In other words, the image source device 200 may determine whether it is the unauthorized system intrusion or the system check.

When the door 102 of the display apparatus 100 is opened, the image source controller 250 may request the user (or administrator) for authentication to check whether it is the unauthorized system intrusion or the system check. For example, the image source controller 250 may display the screen 400 including an authentication request message 420 of "Please enter an authentication number for administrator authentication" as illustrated in FIG. 12 on the user display 220. Also, the image source controller 250 may display the screen 400 including an authentication number input area 430 for receiving the authentication number of the user (or administrator).

The image source controller 250 may determine whether it is the unauthorized system intrusion or the system check according to the authentication result of the user (or administrator).

When the user (or administrator) is authenticated, the image source controller 250 may determine that the door 102 of the display apparatus 100 is opened for system check. For example, the image source controller 250 may compare the input authentication number entered in the authentication number input area 430 with a storage authentication number previously stored for the system check. When the input authentication number and the storage authentication number are the same, the image source controller 250 may authenticate the user (or administrator) and determine that the opening of the door 102 of the display apparatus 100 is not the system intrusion.

When the user (or administrator) is not authenticated, the image source controller 250 may determine that the door 102 of the display apparatus 100 is opened for system intrusion (content leakage). For example, when the authentication number is not input for a predetermined time, or when the input authentication number differs from the storage authentication number, the image source controller 250 may determine that the opening of the door 102 of the display apparatus 100 is the system intrusion.

When it is determined that the opening of the door 102 of the display apparatus 100 is not a system intrusion (NO in 1260), the image source device 200 may perform a system check operation (1270).

When it is determined that the door 102 is opened for system check, the image source device 200 may perform the system check operation and may transmit a signal indicating the start of the system check operation to the plurality of display apparatuses 100.

The image source device 200 may transmit the image frame data to the display device 10 including the plurality of display apparatuses 100 even if the door 102 of the display apparatus 100 is opened during a system check operation.

Each of the plurality of display apparatuses 100 may receive the image frame data and may display the image corresponding to the image frame data.

The system check operation of the image source device 200 is described in more detail below.

When it is determined that the opening of the door 102 of the display apparatus 100 is the system intrusion (YES in 1260), the image source device 200 may perform a content protection operation (1280).

When it is determined that the door 102 is opened due to the system intrusion, the image source device 200 may perform the content operation and transmit the signal indicating the start of the content protection operation to the plurality of display apparatuses 100.

During the content protection operation, the image source device 200 may stop the transmission of the image frame data to the plurality of display apparatuses 100, and the display apparatus in which the door 102 is opened may display the predetermined content protection image.

The content protection operation of the image source device 200 is described in more detail below.

As described above, during system monitoring, the image source device 200 may transmit the image frame data to the plurality of display apparatuses 100 for content playback, and monitor the opening of the doors 102 of the plurality of display apparatuses 100 for content protection.

Figure 13:
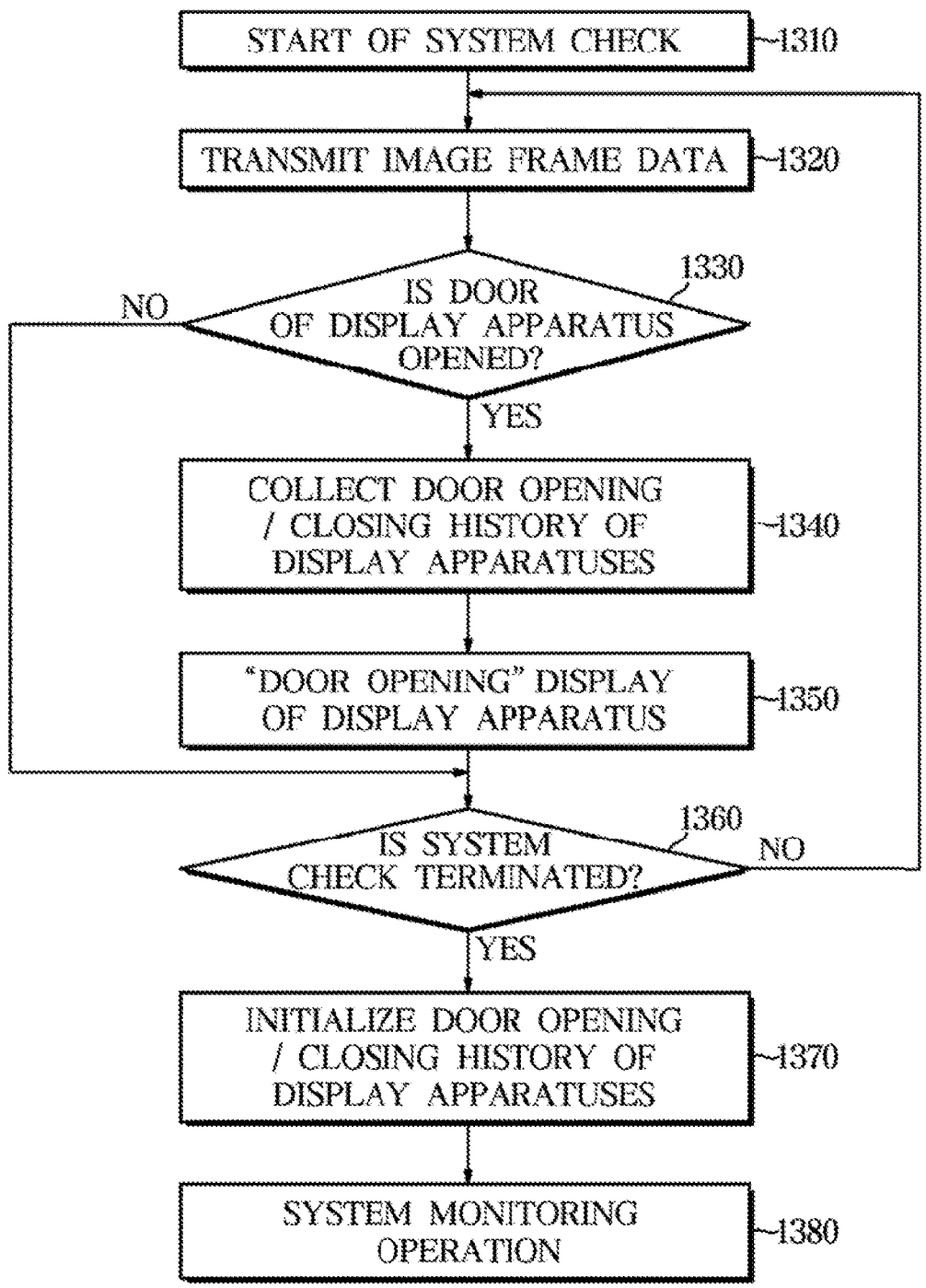
FIG. 13 is a view illustrating a system check operation of the image source device according to an embodiment.

FIG. 13 is a view illustrating a system check operation (1300) of the image source device according to an embodiment.

Referring to FIG. 13, the image source device 200 may start the system check (1310).

When it is determined that the door 102 of one of the plurality of display apparatuses 100 is opened and the door 102 is opened by the user (or administrator) during system monitoring, the image source device 200 may perform the system check operation for checking the plurality of display apparatuses 100.

The image source device 200 may transmit the image frame data to the plurality of display apparatuses 100 (1320).

When it is determined that the door 102 of the display apparatus 100 is opened by the user (or administrator), it may be determined that the risk of content leakage is not high. Accordingly, the image source device 200 may continuously transmit the image frame data to the display device 10 including the plurality of display apparatuses 100 for continuity of content playback.

The image corresponding to the image frame data may be displayed by the plurality of display apparatuses 100 while the image source device 200 transmits the image frame data.

The specific operation in which the image source device 200 transmits the image frame data may be the same as the operation 1220 described in conjunction with FIG. 11.

During transmission of the image frame data, the image source device 200 may determine whether the doors of the display device 10 including the plurality of display apparatuses 100 are opened (1330).

The user (or administrator) may check several display apparatuses.

Thus, the image source controller 250 may monitor the display device 10 including the plurality of display apparatuses 100 to detect an additional door opening of the display apparatus. In particular, the image source controller 250 may receive the door opening signal output from the door open detector 140 of each of the plurality of display apparatuses 100 through the door open signal receiver 240 and determine whether or not the door of the plurality of display apparatuses 100 is opened based on the door opening signal.

The specific operation in which the image source controller 250 determines whether or not the door is opened may be the same as the operation 1230 described in conjunction with FIG. 11.

When it is determined that the door 102 of any one of the plurality of display apparatuses 100 is opened (YES in 1330), the image source device 200 may collect the door opening/closing history of the plurality of display apparatuses 100 (1340).

Because the door opening signal does not include the identification information of the display apparatus, the image source controller 250 may not be able to identify the display apparatus in which the door 102 among the plurality of display apparatuses 100 is opened.

Accordingly, in order to identify the display apparatus in which the door 102 is opened and to confirm the opening of the door 102, the image source controller 250 may transmit the door opening/closing history request to the plurality of display apparatuses 100 through the image source communicator 270 and receive the door opening/closing history from the plurality of display apparatuses 100.

The specific operation in which the image source controller 250 acquires the door opening/closing history of the plurality of display apparatuses 100 may be the same as the operation 1240 described in conjunction with FIG. 11.

Thereafter, the image source device 200 may display the marker indicating the door opening of the display apparatus 100 to the user (or administrator) (1350).

The image source controller 250 may identify the display apparatus which transmitted the door opening/closing history based on the identification information of the display apparatus that is received together with the door opening/closing history, and determine whether or not the door of the corresponding display apparatus is opened based on the door opening/closing history.

When the display apparatus in which the door 102 is opened is identified, the image source controller 250 may display the message indicating the identification information (or disposed positon) of the display apparatus 102 in which the door 102 has been opened, and the message indicating the opening of the door 102 of the display apparatus, on the user display 220.

The specific operation in which the image source controller 250 displays the marker indicating the door opening of the display apparatus 100 may be the same as the operation 1250 described in conjunction with FIG. 11.

Thereafter, the image source device 200 may determine whether the system check is terminated (1360). Also, when it is determined that the doors 102 of the plurality of display apparatuses 100 are not opened (NO in 1330), the image source device 200 may also determine whether the system check is terminated (1360).

During the system check, the image source controller 250 may determine whether the system check by the user (or administrator) has been terminated.

The user (or administrator) may open the door 102 of any one of the plurality of display apparatuses 100 and check the system. After terminating the checking of the plurality of display apparatuses 100, the user (or manager) may input the user input indicating the termination of the system check to the image source device 200 through the user inputter 210.

When the user input indicating the termination of the system check is input, in order to confirm the user (or administrator), the image source controller 250 may request the user (or administrator) for authentication to system check. For example, the image source controller 250 may display the authentication request message "Please input the authentication number to confirm termination of the system check" on the user display 220.

The image source controller 250 may determine the termination of the system check through the user input indicating the termination of the system check and user authentication. In particular, when the user input indicating the termination of the system check is input and the user authentication is successful, the image source controller 250 may determine the termination of the system check.

Also, when the user input indicating the termination of the system check is not inputted or when the user authentication for terminating the system check is failed, the image source controller 250 may determine that the system check is in progress.

When the termination of the system check is not determined (NO in 1360), the image source device 200 may continue the transmission of the image frame data and repeat the determination of the additional door opening of the plurality of display apparatuses 100.

When it is determined that the system check is terminated (YES in 1360), the image source device 200 may initialize the door opening/closing history of the plurality of display apparatuses (1370).

When the system check is terminated, the image source controller 250 may initialize the door opening/closing history stored in the content protection storage 160 of the plurality of display apparatuses 100. The image source controller 250 may prevent the door 102 of the plurality of display apparatuses 100 from being erroneously determined in the future by initializing the door opening/closing history.

In particular, the image source controller 250 may transmit the door opening/closing history initialization request to the plurality of display apparatuses 100 through the image source communicator 270.

The content protection controller 150 of each of the plurality of display apparatuses 100 may receive the door opening/closing history initialization request of the image source device 200 through the content protection communicator 170. Also, in response to receiving the door opening/closing history initialization request, the content protection controller 150 may initialize the door opening/closing history stored in the content protection storage 160. In order to preserve the door opening/closing history, the door opening/closing history stored in the content protection storage 160 may be deleted only by an initialization command of the image source device 200.

After deletion of the door opening/closing history, the content protection controller 150 may transmit an initialization confirmation message to the image source device 200 through the content protection communicator 170.

The image source controller 250 may receive the initialization confirmation message of each of the plurality of display apparatuses 100 and confirm the initialization of the door opening/closing history of the plurality of display apparatuses 100.

Thereafter, the image source device 200 may perform a system monitoring operation (1380).

During the system monitoring operation, the image source device 200 may transmit the image frame data to the plurality of display apparatuses 100, and may monitor the opening of the doors 102 of the plurality of display apparatuses 100.

As described above, the image source device 200 may ensure continuity of content playback by continuing the transmission of image frame data to the plurality of display apparatuses 100 during the system check.

Figure 14:
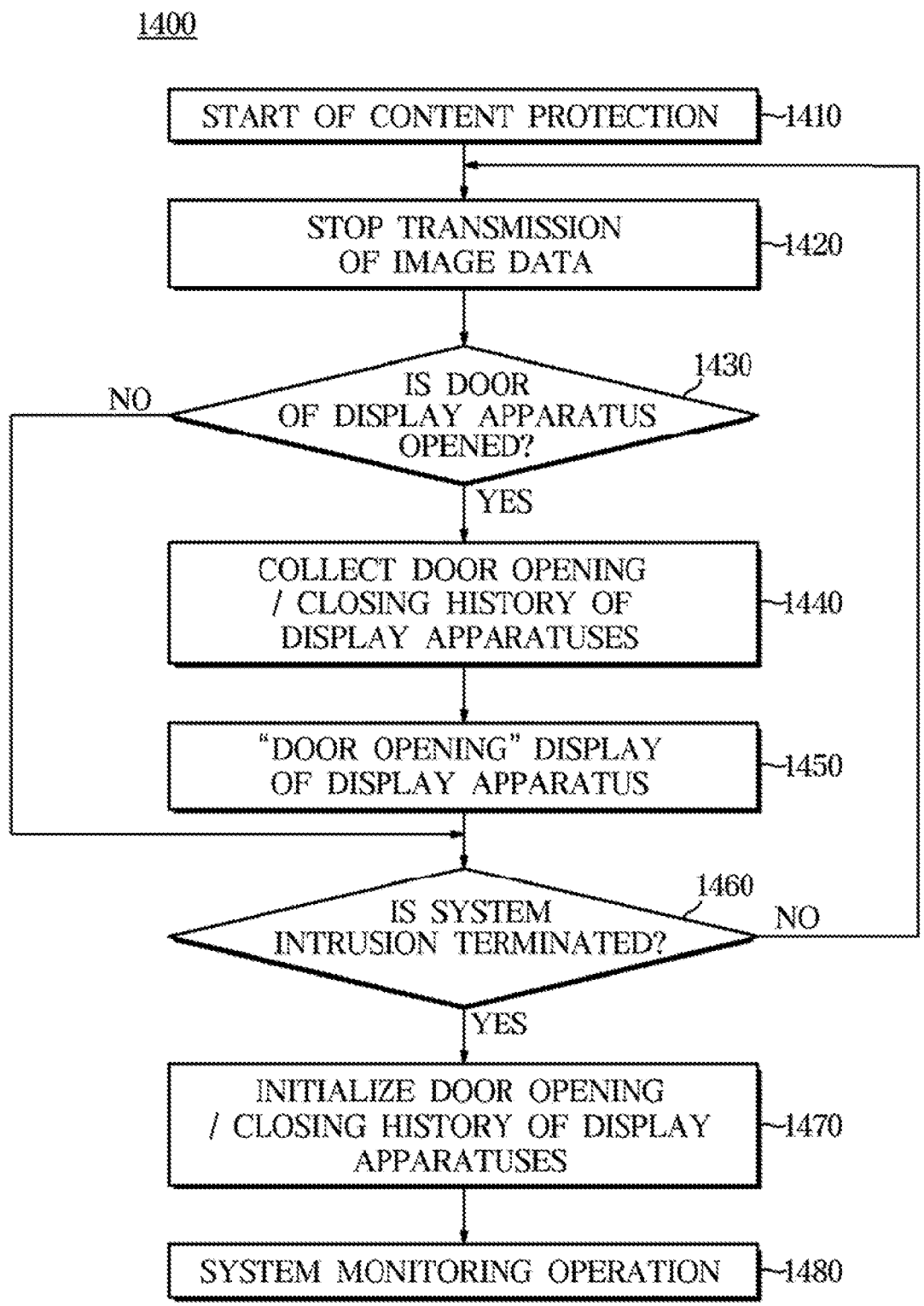
FIG. 14 is a view illustrating a content protection operation of the image source device according to an embodiment.
Figure 15:
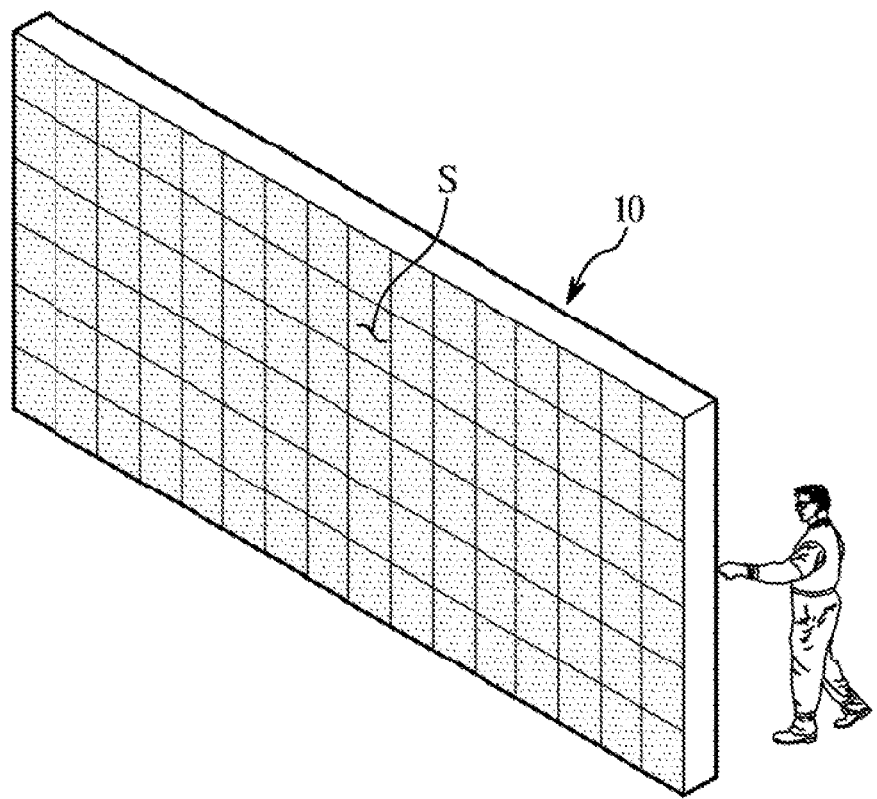
FIGS. 15 and 16 are views illustrating an example of an image which is displayed on a plurality of display apparatuses during the content protection operation shown in FIG. 14.
Figure 16:
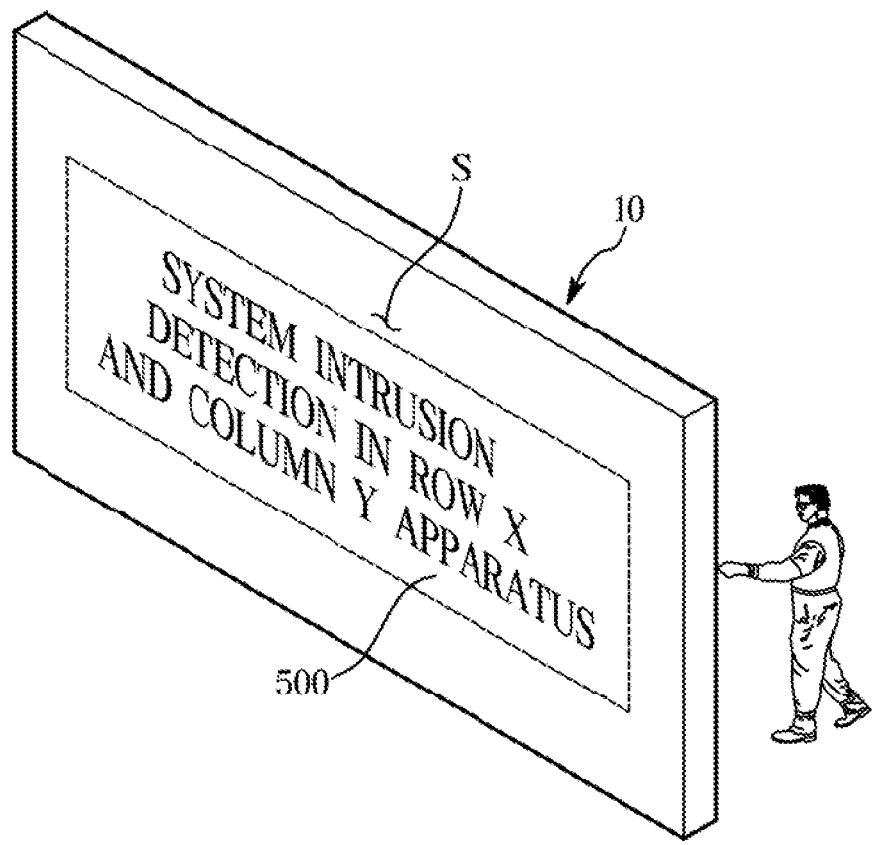

FIG. 14 is a view illustrating a content protection operation (1400) of the image source device according to an embodiment, and FIGS. 15 and 16 are views illustrating an example of an image which is displayed on a plurality of display apparatuses 100 during the content protection operation shown in FIG. 14.

Referring to FIGS. 14, 15 and 16, the image source device 200 may start content protection (1410).

When it is determined that the door 102 of one of the plurality of display apparatuses 100 is opened and the door 102 is not opened by the user (or administrator) during system monitoring, the image source device 200 may perform the system protection operation for the content protection.

The image source device 200 may stop transmission of the image frame data to the plurality of display apparatuses 100 (1420).

When it is determined that the door 102 of the display apparatus 100 is not opened by the user (or administrator), it may be determined that the risk of content leakage is high. In other words, the image source device 200 may determine that it is the system intrusion.

For example, in order to acquire content data, the hacker may open the display apparatus 100 and install a hacking device capable of probing the connector to which the display apparatus 100 and the image source device 200 are connected and may restore (or reproduce) the content from the image frame data acquired by the probe of the connector.

In order to prevent such content leakage, the image source device 200 may stop the transmission of the image frame data to the plurality of display apparatuses 100. Because the transmission of the image frame data is stopped, as illustrated in FIG. 15, the plurality of display apparatuses 100 may stop displaying of the image. For example, no image is displayed on the screen S formed by the plurality of display apparatuses 100, and a black screen may be displayed.

The image source device 200 may stop the transmission of the image frame data of the content and may transmit the image frame data of the predetermined image to indicate the system intrusion to the plurality of display apparatuses 100. In other words, the image source device 200 may transmit the image frame data of the predetermined image to the plurality of display apparatuses 100 so that the plurality of display apparatuses 100 displays an image warning the user (or administrator) of instruction of the system.

The image source device 200 may transmit the image frame data to the display device 10 including the plurality of display apparatuses 100 so that the display device 10 displays the message indicating the system intrusion together with the marker indicating identification information or disposed position of the hacked display apparatus. The display device 10 including the plurality of display apparatuses 10 may display the image including the message indicating the system intrusion together with the marker indicating the identification information or the disposed position of the hacked display apparatus in response to the reception of the image frame data. For example, the display device 10 including the plurality of display apparatuses 100 may display a message 500 of "system intrusion detection in the display apparatus in the row X and column Y" on the screen S as illustrated in FIG. 16.

In addition, the image source device 200 may warn the user (or administrator) of the system intrusion through a separate warning means. For example, the image source device 200 may output a warning sound through the sound output means or may transmit a warning message to the portable communication device of the user (or administrator) through the communication means.

Thereafter, the image source device 200 may determine whether the doors of the plurality of display apparatuses 100 are opened (1430).

The hacker may open the door 102 of the plurality of display apparatuses 100 and install the hacking device in order to leak leakage from various display apparatuses. In addition, the user (or administrator) may open the door 102 of the display apparatus 100 to check the system for confirming the system intrusion.

Accordingly, the image source controller 250 may monitor the plurality of display apparatuses 100 to detect door opening of an additional display apparatus.

The specific operation in which the image source controller 250 determines whether or not the door is opened may be the same as the operation 1230 described in conjunction with FIG. 11.

When it is determined that the door 102 of any one of the plurality of display apparatuses 100 is opened (YES in 1430), the image source device 200 may collect the door opening/closing history of the plurality of display apparatuses 100 (1440).

The specific operation in which the image source controller 250 acquires the door opening/closing history of the plurality of display apparatuses 100 may be the same as the operation 1240 described in conjunction with FIG. 11.

Thereafter, the image source device 200 may display the marker indicating the door opening of the display apparatus 100 to the user (or administrator) (1450).

The specific operation in which the image source controller 250 displays the marker indicating the door opening of the display apparatus 100 may be the same as the operation 1250 described in conjunction with FIG. 11.

Thereafter, the image source device 200 may determine whether the system intrusion is terminated (1460). Also, when it is determined that the doors 102 of the plurality of display apparatuses 100 are not opened (NO in 1430), the image source device 200 may also determine whether the system intrusion is terminated (1460).

During the content protection, the image source controller 250 may determine whether the system intrusion is terminated.

The user (or administrator) may check the system intrusion and check the system in response to the system intrusion. During the system check, the user (or administrator) may take action to protect the content. For example, the user (or administrator) may remove the hacking device for content leakage. After terminating the system check corresponding to the system intrusion, the user (or administrator) may input the user input indicating the termination of the system intrusion to the image source device 200 through the user inputter 210.

When the user input indicating the termination of the system intrusion is input, the image source controller 250 may request the user (or administrator) to perform authentication for checking the system to confirm the user (or administrator). For example, the image source controller 250 may display an authentication request message "Please input the authentication number to confirm the system intrusion termination" on the user display 220.

The image source controller 250 may determine the termination of the system intrusion through the user input indicating the termination of the system intrusion and user authentication. In particular, when the user input indicating the termination of the system intrusion is input and the user authentication is successful, the image source controller 250 may determine that the system intrusion is terminated or eliminated.

Also, when the user input indicating the termination of the system intrusion is not inputted or the user authentication for the system intrusion termination is failed, the image source controller 250 may determine that the system intrusion is continuing.

When the termination of the system intrusion is not determined (NO in 1460), the image source device 200 may continuously interrupt the transmission of the image frame data and repeat the determination of the additional door opening of the plurality of display apparatuses 100.

When it is determined that the system intrusion is terminated (yes in 1460), the image source device 200 may initialize the door opening/closing history of the plurality of display apparatuses 100 (1470).

When the system check is terminated, the image source controller 250 may initialize the door opening and closing history stored in the content protection storage 160 of the plurality of display apparatuses 100 to prevent erroneous determination of the opening of the door 102 of the plurality of display apparatuses 100 in the future.

In particular, the image source controller 250 may transmit a door opening/closing history initialization request to the plurality of display apparatuses 100 through the image source communicator 270. The plurality of display apparatuses 100 may initialize the door opening/closing history stored in the content protection storage 160.

The specific operation in which the image source device 200 initializes the door opening/closing history may be the same as the operation 1370 described in conjunction with FIG. 11.

Thereafter, the image source device 200 may perform the system monitoring operation (1380).

During the system monitoring operation, the image source device 200 may transmit the image frame data to the plurality of display apparatuses 100, and may monitor the opening of the doors 102 of the plurality of display apparatuses 100.

As described above, the image source device 200 may prevent the content from being leaked by stopping the transmission of the image frame data to the plurality of display apparatuses 100 during the content protection.

Hereinafter, the operation of the display apparatus 100 will be described. Although the operation of the display apparatus 100 is described on behalf of the display device 10, the operation of each of the plurality of display apparatuses 100 may be the same as the operation of the display apparatus 100 of the plurality of display apparatuses 100.

Figure 17:
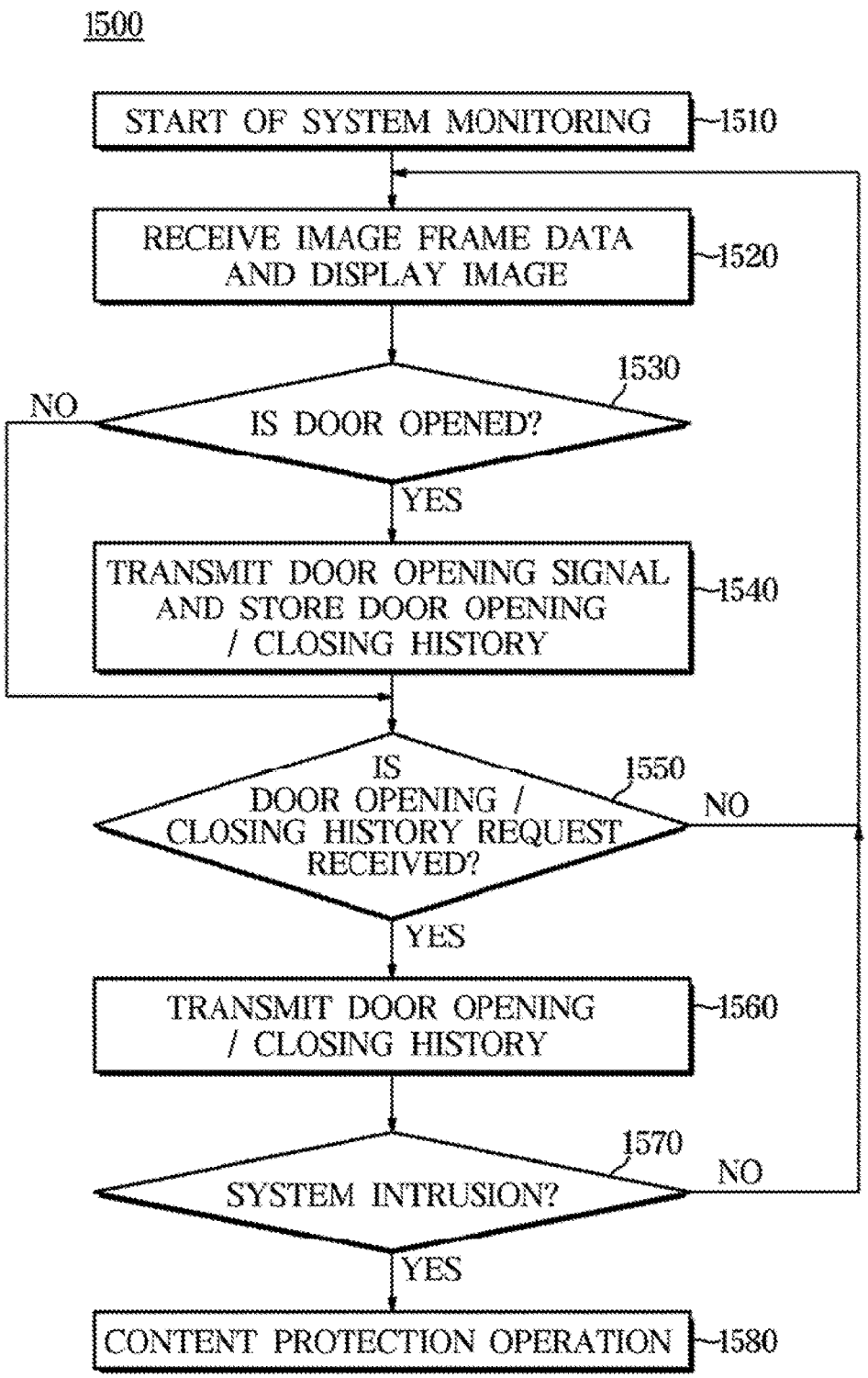
FIG. 17 is a view illustrating the system monitoring operation of the display apparatus according to an embodiment.

FIG. 17 is a view illustrating the system monitoring operation (1500) of the display apparatus according to an embodiment.

Referring to FIG. 17, the display apparatus 100 may start system monitoring (1510).

During system startup, the image source device 200 may request the door opening/closing history to the plurality of display apparatuses 100, and in response to the door opening/closing history request of the image source device 200, the display apparatus 100 may read the door opening/closing history stored in the content protection storage 160, and transmit the door opening/closing history to the image source device 200.

When the opening of the door 102 of the display device 10 is not found, the image source device 200 and the plurality of display apparatuses 100 may perform the system monitoring operation for playing the content.

The display apparatus 100 may receive the image frame data from the image source device 200 and display the image (1520).

The image data receiver 110 may receive the image frame data from the image source device 200 through the image data transmission line L1 (see FIG. 5), and output the received image frame data to the display controller 120.

The display controller 120 may obtain the image frame data corresponding to the disposed position where the display apparatus 100 is disposed in the full image frame data received by the image data receiver 110. In addition, the obtained image frame data may be output to the image display 130.

The image display 130 may display the image according to the image frame data output from the display controller 120.

The display apparatus 100 may determine whether the door 102 provided in the cabinet 101 is opened (1530).

The door open detector 140 may detect the opening of the door 102 provided on the rear surface of the cabinet 101 and output the door opening signal to the door open signal transmitter 180 and the content protection controller 150 when the door 102 is opened.

The content protection controller 150 may receive the door opening/closing signal from the door open detector 140 and may determine whether the door 102 provided in the cabinet 101 is opened. For example, upon receiving the door closing signal from the door open detector 140, the content protection controller 150 may determine that the door 102 is closed. When the door open detector 140 receives the door open signal, the controller 150 may determine the opening of the door 102.

When it is determined that the door 102 is opened (yes in 1530), the display apparatus 100 may transmit the door opening signal to the image source device 200 and store the door opening/closing history in the content protection storage 160 (1540).

When the door 102 is opened, the door open detector 140 may transmit the door opening signal to the door open signal transmitter 180 and the content protection controller 150.

The door open signal transmitter 180 may receive the door opening/closing signal from the door open detector 140 and may transmit the door opening/closing signal to the image source device 200 through the door open signal transmission line L3. For example, the door open signal transmitter 180 may be implemented by the connector connecting between the door open signal transmission line L3 and the display apparatus 100, or by the communication devices for transmitting a communication signal to the image source device 200 according to the door opening/closing signal.

Also, the content protection controller 150 may generate the opening/closing status information indicating the opening and closing of the door 102 corresponding to the door opening/closing signal. In addition, the content protection controller 150 may periodically store the current time and the opening/closing status information indicating the opening and closing of the current door 102 in the content protection storage 160 at predetermined time intervals.

The content protection storage 160 may store the opening/closing status information (e.g., 'door closing') indicating closing of the door 102, the opening/closing status information (e.g., 'door opening') indication opening of the door 102, and the opening/closing status information (e.g., 'closing after door opening') indication closing after opening of the door 102.

The door opening/closing history may include opening/closing status information indicating opening/closing of the door 102 with the lapse of time and storage time of the opening/closing status information.

Thereafter, the display apparatus 100 may determine whether the door opening history request is received from the image source device 200 (1550). Also, even if the door 102 is not opened (NO in 1530), the display apparatus 100 may determine whether the door opening/closing history request is received from the image source device 200 (1550).

Upon receiving the door opening signal, the image source device 200 may transmit the door opening/closing history request to the plurality of display apparatuses 100 to identify the display apparatus in which the door 102 is opened.

The plurality of display apparatuses 100 may receive the door opening/closing history request of the image source device 200 through the content protection communicator 170.

Because the door opening/closing history request is transmitted to all the plurality of display apparatuses 100, the display apparatus in which the door 102 is not opened as well as the display apparatus in which the door 102 is opened may also receive the door opening/closing history request.

When the door opening/closing history request is not received (NO in 1550), the display apparatus 100 may repeat the reception of the image frame data, the display of the image, and the opening monitoring of the door 102.

When the door opening/closing history request is received (YES in 1550), the display apparatus 100 may transmit the door opening/closing history to the image source device 200 (1560).

The content protection controller 150 may control the content protection communicator 170 to transmit the door opening/closing history to the image source device 200 through the communication data transmission line L2 (see FIG. 5).

In response to the door opening/closing history request, the content protection controller 150 may read the door opening/closing history from the content protection storage 160. The door opening/closing history may include the opening/closing status information indicating opening/closing of the door 102 with the lapse of time and storage time of the opening/closing status information.

Thereafter, the display apparatus 100 may determine whether the system is intruded (1570).

When the door 120 of any one of the plurality of display apparatuses 10 is opened, the image source device 200 may determine whether the door 102 is opened due to the system intrusion or the door 102 is opened for the system check.

The image source device 200 may transmit the signal indicating the start of the system check operation to the plurality of display apparatuses 100 when it is determined that the door 102 is opened due to check of the system. The image source device 200 may transmit the signal indicating the start of the system protection operation to the plurality of display apparatuses 100 when it is determined that the door 102 is opened due to intrusion of the system.

The display apparatus 100 may determine whether the system is intruded according to the signal received from the image source device 200.

When it is determined that the system is not intruded (NO in 1570), the display apparatus 100 may repeat the reception of the image frame data, the display of the image, and the opening monitoring of the door 102.

When it is determined that the system is intruded (YES in 1570), the display apparatus 100 may perform the content protection operation (1580).

During the content protection operation, the display apparatus 100 may stop displaying the image. In addition, the display apparatus in which the door 102 is opened may display a predetermined content protection image.

The content protection operation of the display apparatus 100 is described in more detail below.

As described above, during the system monitoring, the display apparatus 100 may display the image corresponding to the image frame data received from the image source device 200 for content playback and monitor the opening of the door 102 provided in the cabinet 101 for content protection.

The operation of the display apparatus 100 during the system check may be the same as the operation during system monitoring.

Figure 18:
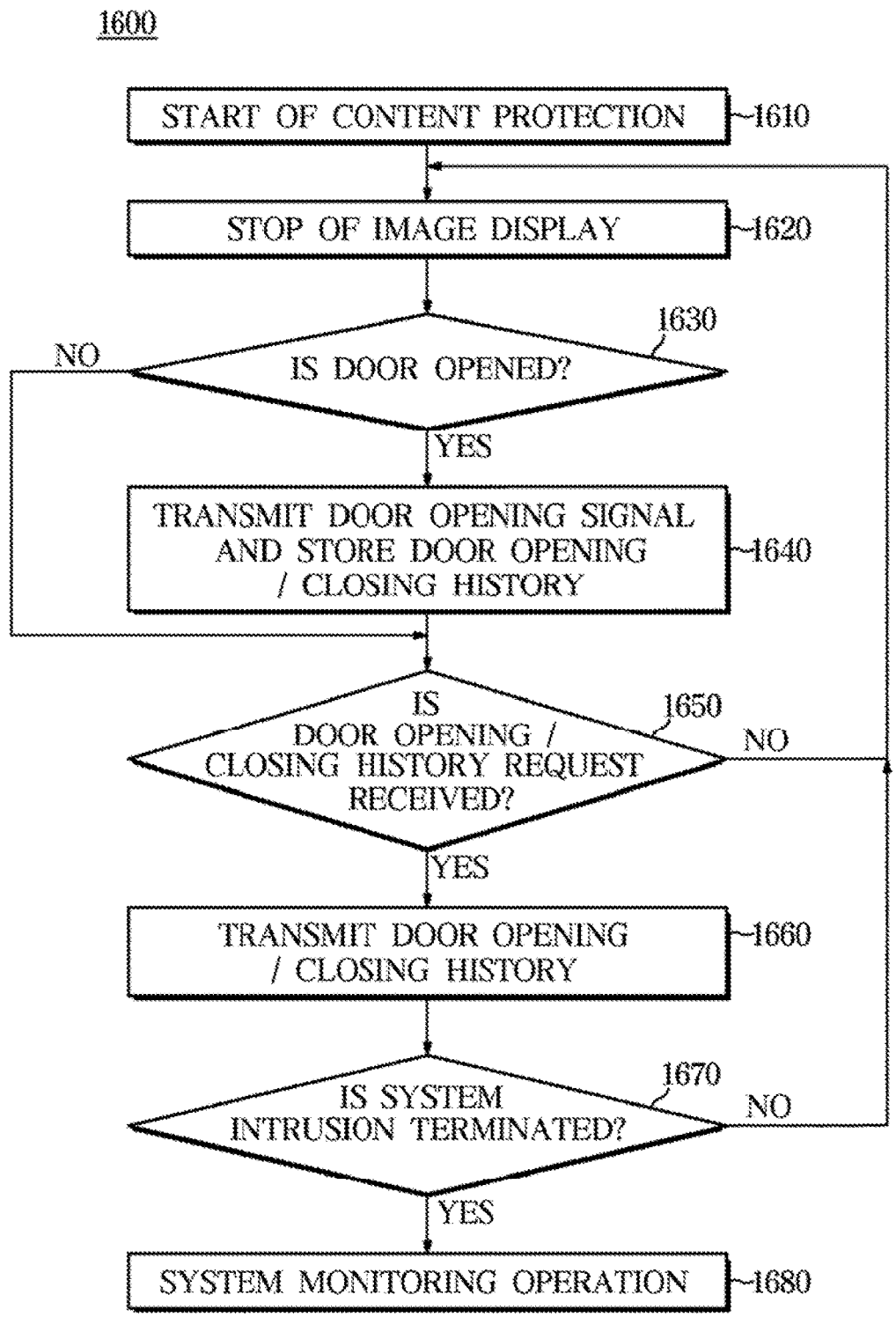
FIG. 18 is a view illustrating the content protection operation of the display apparatus according to an embodiment.
Figure 19:
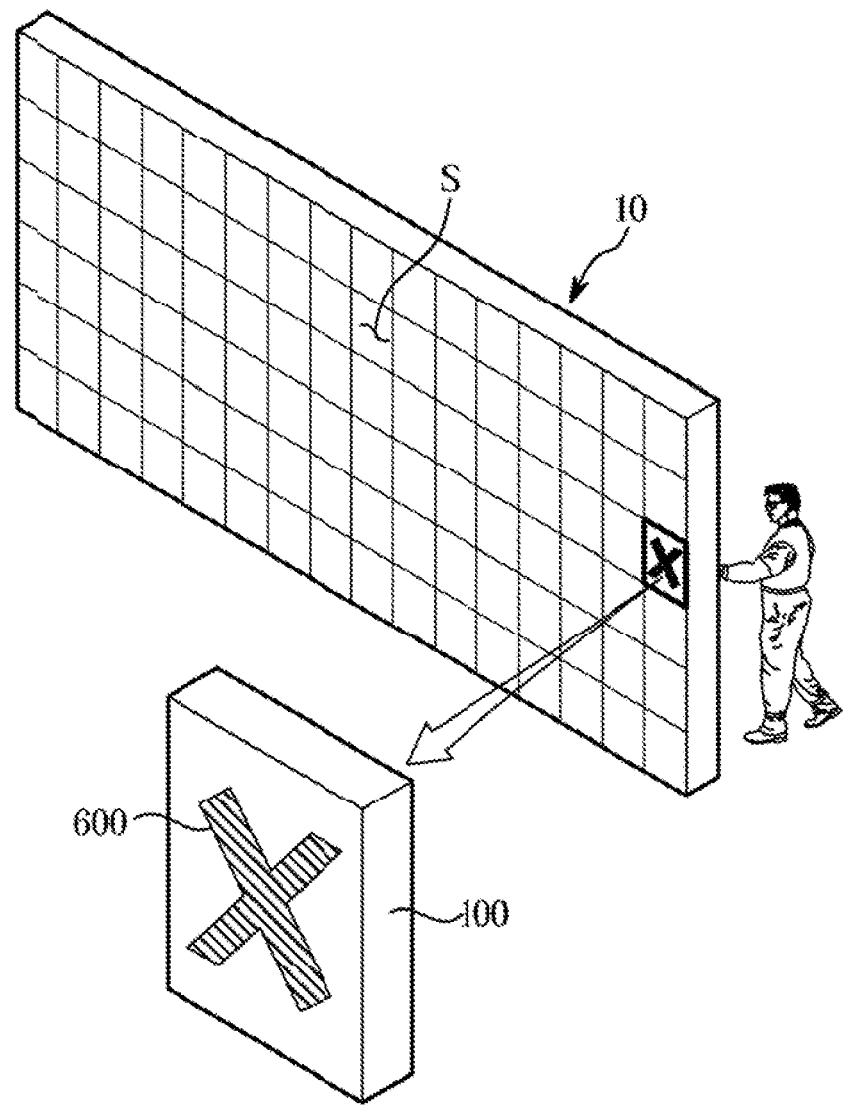
FIG. 19 is a view illustrating an example of the image which is displayed on the plurality of display apparatuses during the content protection operation shown in FIG. 18.

FIG. 18 is a view illustrating the content protection operation (1600) of the display apparatus according to an embodiment, and FIG. 19 is a view illustrating an example of the image which is displayed on the plurality of display apparatuses 100 during the content protection operation shown in FIG. 18.

Referring to FIGS. 18 and 19, the display apparatus 100 may start content protection (1610).

When the image source device 200 detects the opening of the door 102 of any one of the plurality of display apparatuses 100 during system startup or the image source device 200 determines the display system intrusion during system monitoring, the image source device 200 may perform the content protection operation and transmit the signal indicating the start of the content protection operation to the plurality of display apparatuses 100.

In response to the signal of the image source device 200, the display apparatus 100 may perform the content protection operation for content playback.

The display apparatus 100 may stop displaying the image (1620).

During the content protection operation, the image source device 200 may stop the transmission of the image frame data. Accordingly, during the content protection operation, the display apparatus 100 may also stop displaying the image corresponding to the image frame data received from the image source device 200.

The display apparatus 100 may determine whether the door 102 provided in the cabinet 101 is opened (1630).

The hacker may open the door 102 of the plurality of display apparatuses 100 and install the hacking device in order to leak leakage from various display apparatuses. Thus, the display apparatus 100 may detect the opening of the additional door 102.

The specific operation of the door open detection of the display apparatus 100 may be the same as the operation 1530 described in conjunction with FIG. 17.

When it is determined that the door 102 is opened (YES in 1630), the display apparatus 100 may transmit the door opening signal to the image source device 200 and store the door opening/closing history in the content protection storage 160 (1640).

When the door 102 is opened, the door open detector 140 may transmit the door opening signal to the door open signal transmitter 180 and the content protection controller 150, and the content protection controller 150 may generate the opening/closing status information indicating the opening/closing of the door 102 corresponding to the door opening/closing signal.

The specific operation of display apparatus 100 may be the same as operation 1540 described in conjunction with FIG. 17.

Also, when the opening of the door 102 is detected during the content protection, the display apparatus 100 may display the predetermined content protection image.

In response to receiving the door opening signal from the door open detector 140, the content protection controller 150 may transmit the door opening signal to the display controller 120. In response to receiving the door opening signal from the content protection controller 150, the display controller 120 may control the image display 130 to display the predetermined content protection image.

As such, when the door 102 is opened, the display apparatus 100 may display the predetermined content protection image so that the user (or administrator) can easily recognize the intrusion in the display system 1 or the opening of the door 102. For example, the display apparatus 100 may display an image 600 indicating 'X' as illustrated in FIG. 19, and the user (or administrator) may easily find the display apparatus 100 in which the door 102 is opened due to the 'X' image 600 displayed on the display apparatus 100.

Thereafter, the display apparatus 100 may determine whether the door opening history request is received from the image source device 200 (1650). Also, even if the door 102 is not opened (NO in 1630), the display apparatus 100 may determine whether the door opening/closing history request is received from the image source device 200 (1650).

The specific operation of receiving the door opening/closing history request of the display apparatus 100 may be the same as the operation 1550 described in conjunction with FIG. 17.

When the door opening/closing history request is not received (No in 1650), the display apparatus 100 may repeat the reception of the image frame data, the display of the image, and the opening monitoring of the door 102.

When the door opening/closing history request is received (YES in 1650), the display apparatus 100 may transmit the door opening/closing history to the image source device 200 (1660).

The specific operation of the door opening/closing history transmission of the display apparatus 100 may be the same as the operation 1560 described in conjunction with FIG. 17.

Thereafter, the display apparatus 100 may determine whether the system intrusion is terminated (1670).

During the content protection, the display apparatus 100 may determine whether the system intrusion is terminated. The user (or administrator) may check the system intrusion and check the system in response to the system intrusion. After terminating the system check corresponding to the system intrusion, the user (or administrator) may input the user input indicating the termination of the system intrusion to the image source device 200 through the user inputter 210.

When the user input indicating the termination of the system intrusion is input, the image source device 200 may transmit the message indicating the termination of the system intrusion to the plurality of display apparatuses 100.

The display apparatus 100 may determine whether the system intrusion is terminated according to the signal received from the image source device 200.

When it is determined that the intrusion of the system has not been terminated (NO in 1670), the display apparatus 100 may continuously stop displaying the image and repeat the opening monitoring of the door 102.

When it is determined that the intrusion of the system is terminated (YES in 1670), the display apparatus 100 may perform the system monitoring operation (1680).

During the system monitoring operation, the display apparatus 100 may resume displaying the image. In addition, the display apparatus 100 may continuously monitor the opening of the door 102.

As described above, during the content protection, the display apparatus 100 may stop displaying the image for protecting the content.

Figure 20:
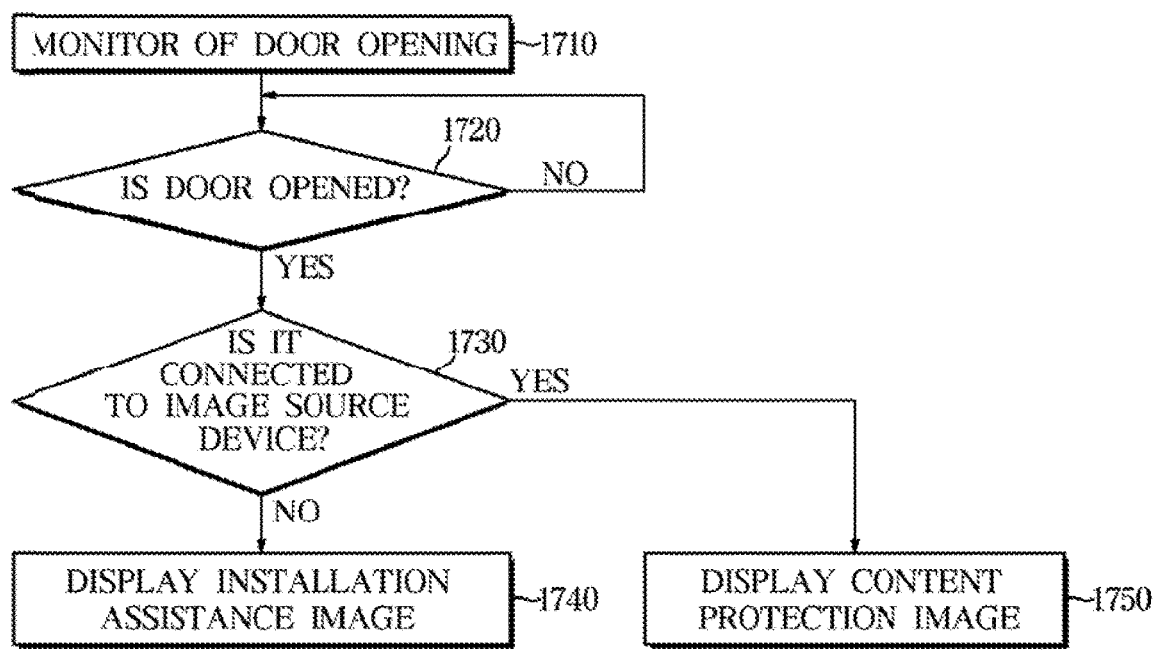
FIG. 20 is a view illustrating a door open monitoring operation of the display apparatus according to an embodiment.
Figure 21:
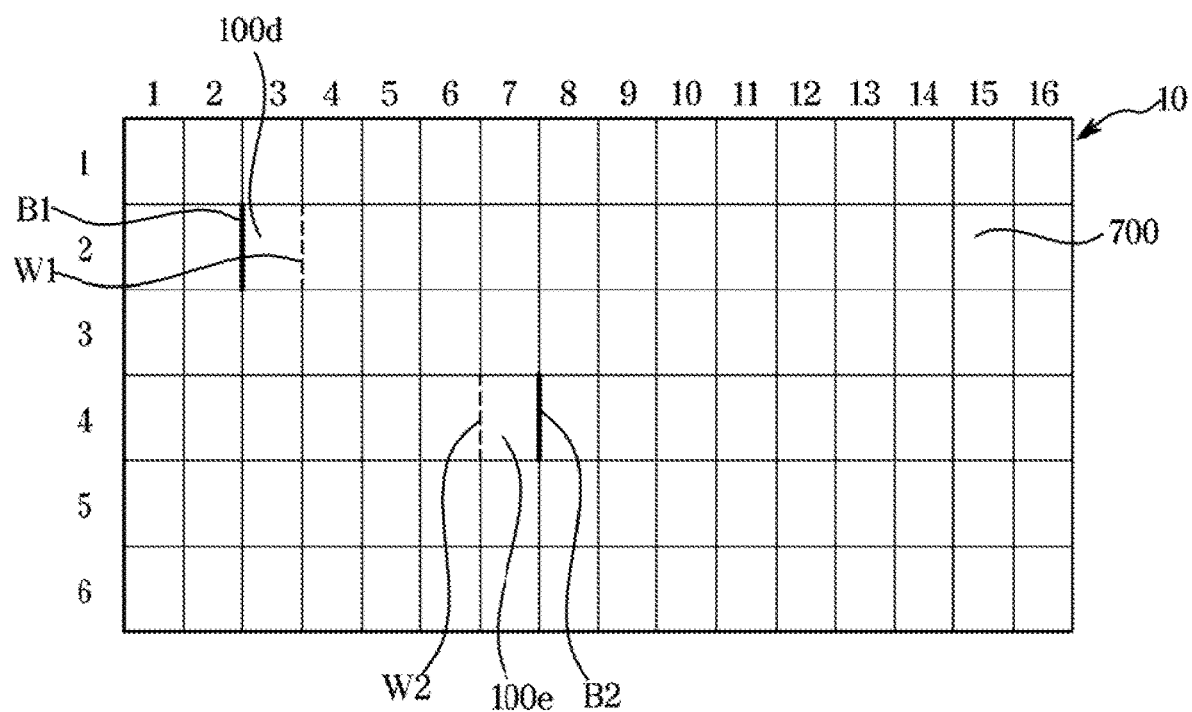
FIG. 21 is a view illustrating an example of the image which is displayed on the plurality of display apparatuses during the door open monitoring operation shown in FIG. 20.

FIG. 20 is a view illustrating a door open monitoring operation of the display apparatus according to an embodiment, and FIG. 21 is a view illustrating an example of the image which is displayed on the plurality of display apparatuses 100 during the door open monitoring operation shown in FIG. 20.

Referring to FIGS. 20 and 21, another example of the operation 1700 of the display apparatus 100 when the door 102 of the display apparatus 100 is opened is described.

The display apparatus 100 may monitor the opening of the door 102 (1710).

The display apparatus 100 may include the door open detector 140 for detecting the opening of the door 102 provided on the rear surface of the cabinet 101. The door open detector 140 may include the door switch 300 or an infrared sensor 400, and the like.

The display apparatus 100 may determine whether the door 102 is opened (1720).

The door open detector 140 may detect the opening of the door 102 provided on the rear surface of the cabinet 101 and output the door opening signal to the door open signal transmitter 180 and the content protection controller 150 when the door 102 is opened.

The content protection controller 150 may receive the door opening/closing signal from the door open detector 140 and determine whether the door 102 provided in the cabinet 101 is opened.

When it is determined that the door 102 is not opened (NO in 1720), the display apparatus 100 may repeat the determination of whether or not the door 102 is opened.

When it is determined that the door 102 is opened (YES in 1720), the display apparatus 100 may determine whether the display apparatus 100 is connected to the image source device 200 (1730).

The door 102 of the display apparatus 100 may be opened for various purposes.

For example, the hacker may open the door 102 of the display apparatus 100 to install the hacking device for the leakage of contents. In addition, the user (or administrator) may open the door 102 of the display apparatus 100 to check the system.

In particular, the user (or administrator) may open the doors 102 of the plurality of display apparatuses 10 to install the plurality of display apparatuses 10 and to control the arrangement of the plurality of display apparatuses 10. As described above, the display system 1 may include the plurality of displays 10, and the plurality of displays 10 may integrally form a single screen. Therefore, a process of assembling the plurality of displays 10 is required, and the door 102 of each of the plurality of displays 10 may be opened in the process of assembling the plurality of displays 10.

The display apparatus 100 may be connected to the image playing apparatus 200 while the display device 10 displays image of the content. On the other hand, during the installation of the display device 10, the display apparatus 100 may not be connected to the image source device 200. In other words, the display apparatus 100 may determine whether the display device 10 is being installed or being checked based on whether or not the apparatus is connected to the image source device 200.

As such, the display controller 120 may determine whether the display apparatus 10 is connected to the image source device 200 or not, in order to determine whether the display apparatus 10 is being installed or is being checked. For example, the display controller 120 may transmit a detection signal to the image source device 200 through the image data receiver 110 and/or the content protection communicator 170 and may wait for a response signal from the image source device 200. When the response signal is received from the image source device 200, the display apparatus 100 may determine that the display apparatus 100 is connected to the image source device 200. When the response signal is not received from the image source device 200, the display apparatus 100 may determine that the display apparatus 100 is not connected to the image source device 200.

When it is determined that the display apparatus 100 is not connected to the image source device 200 (NO in 1730), the display apparatus 100 may display a predetermined installation assistance image (1740).

When the door 102 of the cabinet 101 is opened and the display apparatus 100 is not connected to the image source device 200, the display controller 120 may determine that the display device 10 is being installed or being checked.

When the display apparatus 100 is disposed at a position deviating from its original position during the installation of the plurality of display apparatuses 100, a seam between the plurality of display apparatuses 100 may be seen in the image displayed by the plurality of display apparatuses 100.

For example, when the distance between the displays 10 is less than the reference distance, a white (bright) line may be visible between the displays 10, and when the distance between the displays 10 is greater than the reference distance, a dark line may be visible between the display devices 10. When it is determined that the plurality of display apparatuses 100 are installed or checked, the display controller 120 may control the image display 130 to display the predetermined installation assistance image in order to prevent the boundary between the displays 10 from being seen.

In particular, the display controller 120 may store the installation assistance image in advance in the memory 122. When it is determined that the plurality of display apparatuses 100 are installed, the display controller 120 may control the image display 130 to display the installation assistance image. For example, the display controller 120 may control the image display 130 to display the white image 700 as illustrated in FIG. 21. When the white image 700 is displayed, the dark lines B1 and B2 and the bright lines W1 and W2 may be seen according to the arrangement of the plurality of display apparatuses 100. When the display apparatus 100d in the third column and the second row is deflected to the right, the dark line B1 may be seen on the left side of the display apparatus 100d and the bright line W1 may be seen on the right side of the display apparatus 100d. In addition, when the display apparatus 100e in the seventh column and the fourth row is deflected to the left, the bright line W2 may be seen on the left side of the display apparatus 100e and the dark line B2 can be seen on the right side of the display apparatus 100e.

The user (or administrator) may adjust the arrangement of the plurality of display apparatuses 100 according to the positions of the dark lines B1 and B2 and the bright lines W1 and W2.

When it is determined that the display apparatus 100 is connected to the image source device 200 (YES in 1730), the display apparatus 100 may display a predetermined content protection image (1750).

When the door 102 of the cabinet 101 is opened and the display apparatus is connected to the image source device 200, the display controller 120 may determine the occurrence of the system intrusion for hacking.

The display controller 120 may control the image display 130 to display the predetermined content protection image. For example, the display controller 120 may display the image indicating 'X' as illustrated in FIG. 19 described above.

The user (or administrator) may easily find the display apparatus 100 in which the door 102 is opened due to the 'X' image displayed on the display apparatus 100.

As described above, when the door 102 is opened, the display apparatus 100 may display the predetermined image according to whether the display apparatus 100 is connected to the image source device 200 or not. For example, when the display apparatus 100 is connected to the image source device 200, the display apparatus 100 may display the content protection image for content protection, and when the display apparatus 100 is not connected to the image source device 200, the display apparatus 100 may display the installation assistance image for installation of the apparatuses 10.

As is apparent from the above description, according to an aspect of an embodiment, there is provided a display system including a plurality of display apparatuses capable of displaying one image as a whole.

According to another aspect of an embodiment, there is provided a display system capable of detecting an external intrusion into each of the plurality of display apparatuses.

According to another aspect of an embodiment, there is provided a display system capable of protecting content in response to the external intrusion detection for the display apparatuses.

Although a few embodiments of the present disclosure have been shown and described above, it would be appreciated by those skilled in the art that various changes may be made therein without departing from the principles and spirit of the inventive concept, the scope of which is defined in the claims and their equivalents.

What is claimed is:

1. A display apparatus comprising:
   a cabinet;
   a display panel provided on the cabinet;
   a door provided on the cabinet and configured to be opened and closed;
   a first detector configured to detect opening of the door and output a first signal in response to the door being opened;
   an image data receiver configured to receive content data from an image source device;
   a first controller configured to control the display panel to display a first image corresponding to the content data received from the image source device and control the display panel to display a second image different from the first image in response to receiving the first signal;
   a second controller configured to receive the first signal from the first detector in response to the door being opened; and
   a transmitter configured to receive the first signal from the first detector and transmit the first signal to the image source device,
   wherein the first detector comprises a door switch, and
   wherein the door switch comprises:
      first and second terminals connected to the transmitter and being separated from each other;
      third and fourth terminals connected to the second controller and being separated from each other; and
      a switch body configured to electrically connect the first and second terminals or electrically connect the third and fourth terminals based on the door being opened or closed.

2. The display apparatus according to claim 1, wherein the first controller is further configured to control the display panel to display the second image in response to receiving the first signal while the first controller is connected to the image source device.

3. The display apparatus according to claim 1, further comprising
   a memory,
   wherein the second controller is configured to store door status information in the memory in response to receiving the first signal.

4. The display apparatus according to claim 3, wherein first power is independently supplied to the first detector, the memory and the second controller separate from second power being supplied to the display panel and the first controller.

5. The display apparatus according to claim 1,
   wherein the first detector is configured to output the first signal to both the second controller and the transmitter in response to detecting the door being opened.

6. The display apparatus according to claim 5, wherein the first detector comprises an infrared sensor,
   wherein the infrared sensor comprises:
      a light emitter configured to emit light; and
      a light receiver configured to receive the light emitted from the light emitter based on the door being opened or closed.

7. A display system comprising:
   an image source device; and
   a plurality of display apparatuses configured to receive at least one content data from the image source device and display a first image corresponding to the at least one content data,
   wherein at least one display apparatus of the plurality of display apparatuses comprises:
      a cabinet;
      a display panel provided on the cabinet;
      a door provided on the cabinet and configured to be opened and closed;
      a first detector configured to detect opening of the door and output a first signal in response to the door being opened;
      an image data receiver configured to receive at least one content data from the image source device;
      a first controller configured to control the display panel to display the first image corresponding to the at least one content data and control the display panel to display a second image different from the first image in response to receiving the first signal;
      a memory;
      a second controller configured to receive the first signal from the first detector and configured to store door status information in the memory in response to receiving the first signal; and
      a first transmitter configured to receive the first signal from the first detector and transmit the first signal to the image source device,
   wherein the image source device comprises:
      a second transmitter configured to transmit the at least one content data to the plurality of display apparatuses,
      a first receiver configured to receive the first signal from the at least one display apparatus, and
      a third controller configured to stop transmission of the at least one content data to the plurality of display apparatuses in response to receiving of the first signal.

8. The display system according to claim 7, wherein first power is independently supplied to the first detector, the memory and the second controller separate from second power being supplied to the display panel and the first controller.

9. The display system according to claim 7, wherein the third controller is configured to receive the door status information from the plurality of display apparatuses when the first signal is received, and identify the at least one display apparatus based on the door status information.

10. The display system according to claim 9,
    wherein the third controller is configured to transmit image data of a third image to warn the door of the at least one display apparatus being opened, and
    wherein the first controller is configured to display the third image on the display panel.

11. The display system according to claim 9, wherein the third controller is configured to determine system check or unauthorized system intrusion of the at least one display apparatus.

12. The display system according to claim 11, wherein the third controller is configured to continue transmission of the at least one content data to the plurality of display apparatuses through the second transmitter in response to determining the system check being performed on the at least one display apparatus, and wherein the third controller is configured to stop the transmission of the at least one content data through the second transmitter in response to determining the unauthorized system intrusion occurring on the at least one display apparatus.

13. A display system comprising:

an image source device configured to provide at least one content data; and a display device comprising a plurality of display apparatuses and configured to display a first image corresponding to the at least one content data, wherein each of the plurality of display apparatuses comprises:

a door;

a first detector configured to detect opening of the door and output a first signal in response to the door being opened; and a first controller configured to control the display device to display a second image different from the first image in response to receiving the first signal, wherein the image source device comprises:

a signal receiver configured to receive the first signal from the first detector; and a second controller configured to stop transmission of the at least one content data in response to the signal receiver receiving the first signal.

14. The display system according to claim 13, wherein the second controller is configured to determine whether the first signal is based on system check or unauthorized system intrusion in the display device.

15. The display system according to claim 14, wherein the second controller is configured to continue transmission of the at least one content data to the display device in response to determining that the system check is performed on the display device, and wherein the second controller further is configured to stop the transmission of the at least one content data in response to determining the unauthorized system intrusion in the display device.

* * * * *